(12) United States Patent
Yamazaki et al.

(10) Patent No.: US 8,153,933 B2
(45) Date of Patent: Apr. 10, 2012

(54) WELDING CONTROL APPARATUS AND METHOD

(75) Inventors: Kei Yamazaki, Fujisawa (JP); Keiichi Suzuki, Fujisawa (JP); Eiji Sato, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 549 days.

(21) Appl. No.: 12/364,739

(22) Filed: Feb. 3, 2009

(65) Prior Publication Data

US 2009/0242533 A1    Oct. 1, 2009

(30) Foreign Application Priority Data

Mar. 28, 2008 (JP) ................. 2008-085823

(51) Int. Cl.
*B23K 9/10* (2006.01)
*B23K 33/00* (2006.01)
*B23K 35/00* (2006.01)

(52) U.S. Cl. ............... 219/130.51; 219/137 R

(58) Field of Classification Search ............ 219/130.2, 219/130.21, 130.32, 130.33, 121.11, 121.14, 219/130.51, 134.42, 130.31, 136, 137 R, 219/137 PS
See application file for complete search history.

(56) References Cited

U.S. PATENT DOCUMENTS

| | | | |
|---|---|---|---|
| 5,834,732 A | 11/1998 | Innami et al. | |
| 5,866,873 A * | 2/1999 | Wang et al. | 219/130.51 |
| 6,037,554 A | 3/2000 | Innami et al. | |
| 2007/0102409 A1 | 5/2007 | Koshiishi et al. | |
| 2007/0210048 A1 * | 9/2007 | Koshiishi et al. | 219/130.51 |
| 2008/0237196 A1 | 10/2008 | Yamazaki et al. | |

FOREIGN PATENT DOCUMENTS

| | | |
|---|---|---|
| CN | 101032778 A | 9/2007 |
| JP | 7-47473 | 2/1995 |
| JP | 7-290241 | 11/1995 |
| JP | 8-267238 | 10/1996 |

OTHER PUBLICATIONS

Office Action issued Mar. 17, 2011, in Chinese Patent Application No. 200910127754.2 (with English-language translation).

* cited by examiner

*Primary Examiner* — Geoffrey S Evans
*Assistant Examiner* — Thomas Ward
(74) *Attorney, Agent, or Firm* — Oblon, Spivak, McClelland, Maier & Neustadt, L.L.P.

(57) ABSTRACT

The present invention provides a welding control apparatus including: a droplet separation detecting unit that detects separation of a droplet from a tip end of welding wire; and a waveform generator that alternately generates a first pulse for separating the droplet and a second pulse for shaping the droplet and outputs the generated pulse to a welding power source, the waveform generator generating a third pulse having a pulse shape different in a pulse peak current and/or a pulse width from the second pulse to output the generated third pulse to the welding pulse source after a base time of the first pulse if separation of the droplet is not detected within a peak period, a falling slope period, or a base period of the first pulse to thereby restore a droplet supply regularity.

7 Claims, 15 Drawing Sheets

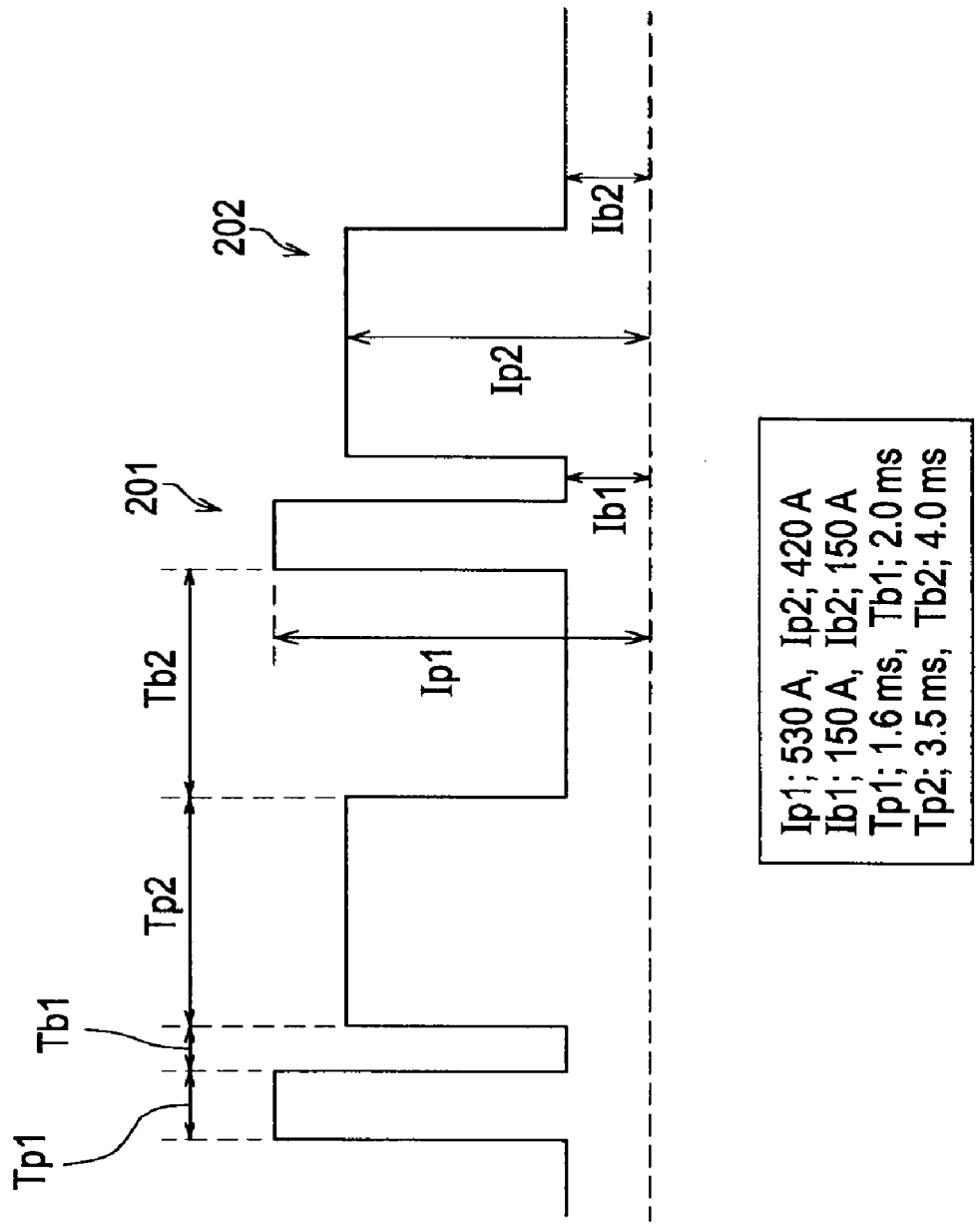

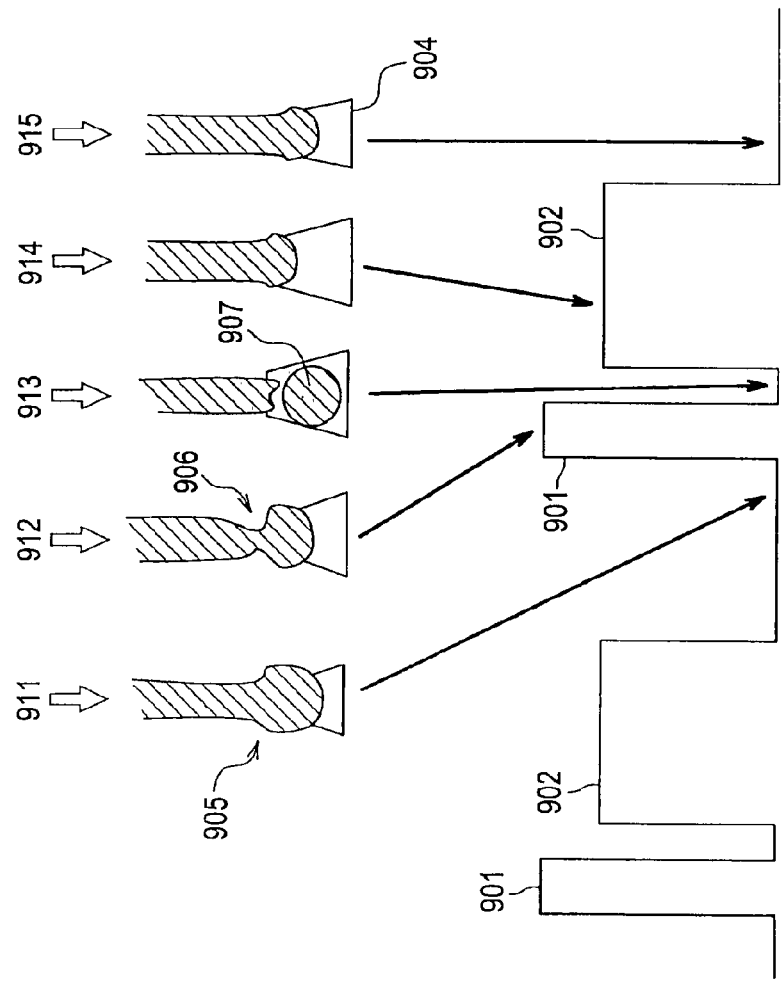

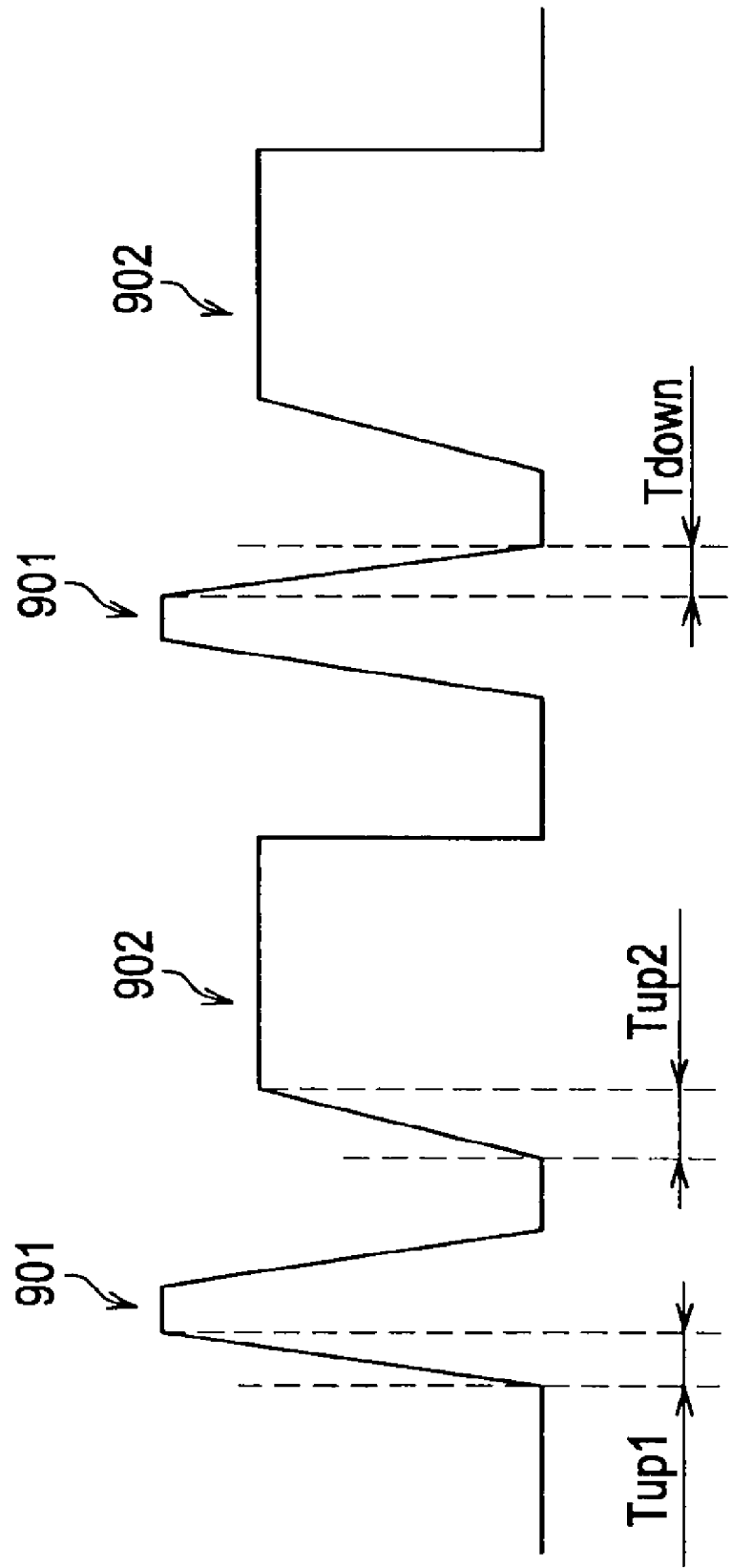

WELDING CONTROL APPARATUS AND METHOD

BACKGROUND OF THE INVENTION

1. Field of the Invention

The present invention relates to a welding control apparatus and more particularly to a welding control apparatus and method used for arc welding with a single carbon dioxide gas or a mixed gas mainly containing the carbon dioxide gas being used as a shielding gas.

2. Description of the Related Art

Hitherto, a MAG welding process using an Ar-(5-30%) $CO_2$ mixed gas as a shielding gas has been adopted in a wide range of fields because fine-grained droplets enable reduction in generation of spatters. In particular, in such a field as requires high-quality welding, an application of a pulse MAG welding process has been spreading. This process outputs a welding current in the form of pulse current with a frequency of about 100 to 350 Hz to thereby supply one droplet at each pulse.

However, since an Ar gas is more expensive than a carbon dioxide gas, a single carbon dioxide gas or a mixed gas mainly containing the carbon dioxide gas is often used as a shielding gas in a general welding process.

On the other hand, if a single carbon dioxide gas or a mixed gas mainly containing the carbon dioxide gas is used as a shielding gas, a droplet is made coarse and irregularly vibrates or deforms due to an arc force as compared to the MAG welding process. This causes a problem that short-circuit to the base metal or interruption of an arc tends to occur, droplet movement becomes irregular, and a large amount of spatters or fumes is generated.

To overcome such a problem, a method for supplying one droplet at each pulse even in carbon-dioxide-gas arc welding is proposed. This method is achieved by applying pulse welding to carbon-dioxide-gas-shielded arc welding in Japanese Unexamined Patent Application Publication Nos. 7-290241 and 7-47473, achieved by prescribing pulse parameters in Japanese Unexamined Patent Application Publication No. 7-290241, and achieved by prescribing pulse parameters and wire components in Japanese Unexamined Patent Application Publication No. 7-47473. This conventional method forms a sufficiently large droplet at the tip end of wire prior to application of a peak current to accelerate constriction of the droplet by means of electromagnetic pinch force to allow the droplet to separate from wire before an arc force presses the droplet back to the wire.

In addition, Japanese Unexamined Patent Application Publication No. 8-267238 discloses another example of the carbon dioxide gas-shielded arc welding method. This welding method switches external characteristics under control as a method of controlling an output power of a welding power source to thereby enable further reduction of spatters.

U.S. Pat. No. 5,834,732 discloses an output control device for a pulse arc welding apparatus using a shielding gas mainly containing a carbon dioxide gas, which detects separation of a droplet by detecting an increase in voltage or resistance and reduces a current amount for a predetermined period from the detection to thereby suppress spatters.

Moreover, according to a technique disclosed in U.S. Pat. No. 6,037,554, spatters are suppressed with a pulse arc welding device using a shielding gas mainly containing a carbon dioxide gas, which outputs two different kinds of pulse waveforms, that is, a first pulse with a pulse period and a base period being set short in accordance with increase in wire amount supplied and a second pulse with a pulse period shorter than that of the first pulse.

Further, the inventors of the present application have proposed a pulse arc welding method for alternately outputting two kinds of pulse waveforms different in pulse peak current level per period with a single carbon dioxide gas or a mixed gas mainly containing the carbon dioxide gas being used as a shielding gas. This method supplies one drop at each period as well as adjusts, even if a distance between a contact tip and a base metal is changed, at least one of a peak current (Ip2), a base current (Ib2), a peak period (Tp2), and a base period (Tb2) of a second pulse used to shape a droplet while maintaining an orderly operation of supplying one droplet at each period to thereby keep a constant arc length (see US Patent Unexamined Application Publication No. 2007/0210048).

Referring to FIG. 14, the pulse arc welding method disclosed in US Patent Unexamined Application Publication No. 2007/210048 is described. FIG. 14 is an explanatory view schematically showing how a welding wire tip end portion is changed over time based on a pulse waveform generated by the pulse arc welding method disclosed in US Patent Unexamined Application Publication No. 2007/0210048. A conventional welding control apparatus for performing the pulse arc welding method alternately generates two kinds of pulse current (pulse signals) different in pulse waveform, more specifically, a first pulse 901 and a second pulse 902 as shown in a lower portion of FIG. 14 and then outputs the generated pulses to a welding power source. Here, pulse parameters of the first pulse 901 and the second pulse 902 are set to satisfy predetermined conditions.

If pulse arc welding is carried out under such conditions, a wire tip end 905 of welding wire (hereinafter simply referred to as "wire") that induces an arc 904 between the wire and a welding material (not shown) is constricted into a droplet and then drops as shown in an upper time-series diagram of FIG. 14. First of all, 911 indicates a state of a droplet from a second pulse peak period in which the droplet grows at the wire tip end 905 after separation of a droplet formed in a previous pulse period up to late second pulse base period. At this time, since a current value rapidly decreases from a second pulse peak current to a second pulse base current, an upward force is weakened at the wire tip end 905, and the droplet is shaped to hang down at the wire tip end 905 as indicated by 911.

Subsequently, in a first pulse peak period, the droplet rapidly separates by means of an electromagnetic pinch force generated by a peak current in the wire while deforming to form a constriction 906 as indicated by 912. When detecting the separation of the droplet 907 from the wire tip end 905, the welding control apparatus rapidly decreases a current value from a current measured upon the detection to a first pulse base current. Then, at the instance when the arc is moved toward the wire from which the droplet was separated, the apparatus shifts a current period to the first pulse base period as indicated by 913 to thereby substantially reduce a current value. As a result, it is possible to considerably reduce an amount of small spatters generated due to flying spray of the wire at the constriction 906 or flying spray of residual melt after separation.

After that, in the second pulse peak period, the welding control apparatus sets a second pulse peak current to such a level that causes neither release nor flying spray of melt residual in the wire from which the droplet was separated, and then allows a droplet to grow in accordance with the second pulse as indicated by 914. Then, in the second pulse base period, the welding control apparatus shapes the droplet as indicated by 915. Following this, the process for shaping the droplet starts again from the state 911. Thus, the welding control apparatus can supply one droplet at each period with clockwork regularity under normal conditions.

All of the methods disclosed in Japanese Unexamined Patent Application Publication Nos. 7-290241, 7-47473, and 8-267238 can supply one droplet at each pulse to enhance regularity for droplet supply although using an inexpensive carbon dioxide gas as a shielding gas as well as can reduce an amount of large spatters as compared with a welding method using no pulse. However, the methods disclosed in these publications prompt a droplet to separate during the pulse peak period, leading to a problem of generating a large amount of small spatters due to flying spray of wire at the constriction of the wire tip end portion upon the separation of a droplet or due to flying spray of melt residual in the wire after the separation of a droplet.

The output control device disclosed in U.S. Pat. No. 5,834,732 can suppress generation of spatters by lowering a current for a predetermined period from detection of droplet separation. However, according to this method, since a pulse peak current is constant at every pulse irrespective of whether melt is released, if the pulse peak current is set so high that a droplet can separate, molten metal residual in wire from which the droplet was separated might be sprayed by means of a strong arc force upon the next application of a pulse peak current after the separation to generate large spatters. Moreover, since the wire is overheated too much upon formation of a droplet, a large amount of fumes is generated. If a pulse peak current is set lower to suppress such generation of fume, a droplet could not separate in a pulse peak period.

Moreover, the pulse arc welding method disclosed in U.S. Pat. No. 6,037,554 can reduce spatters by outputting two kinds of pulse waveforms including a first pulse with a pulse period and a base period being set short in accordance with increase in wire amount supplied and a second pulse with a pulse period shorter than that of the first pulse. However, if a first pulse period and a first base period are set short in accordance with increase in wire amount supplied, a droplet shape at the wire tip end cannot be adjusted prior to application of an electromagnetic pinch force generated by a second pulse and the electromagnetic pinch force cannot effectively act thereon. As a result, it is difficult to supply one droplet at each period, leading to a problem of generating large spatters.

Moreover, the method disclosed in US Patent Unexamined Application Publication No. 2007/210048 alternately outputs two kinds of pulse waveforms different in pulse peak current level per period, making it possible to considerably reduce an amount of small spatters or large spatters sprayed upon the next application of pulse peak current after the separation of a droplet and in addition, supply one droplet at each period with a wide range of wire supplying rate. However, there is a problem that if a first pulse fails to separate a droplet due to any disturbance, a regularity of droplet supply is disturbed from then on and several periods are required to return to a normal state. Thus, spatters and fumes increase during that period.

SUMMARY OF THE INVENTION

It is accordingly an object of the present invention to provide a welding control apparatus and method that can solve the above problem and keep a regularity that one droplet is supplied at each period even if a shielding gas mainly containing a carbon dioxide gas is used and in addition, can immediately return to a normal state even if a droplet supply regularity is disturbed due to any disturbance.

The present invention has been devised with a view to achieving the above object, and provides a welding control apparatus used for arc welding with a single carbon dioxide gas or a mixed gas mainly containing the carbon dioxide gas being used as a shielding gas, including: a droplet separation detecting unit that detects separation of a droplet from a tip end of welding wire; and a waveform generator that alternately generates a first pulse for separating the droplet and a second pulse for shaping the droplet and outputs the generated pulse to a welding power source, and if separation of the droplet is detected, immediately switches a current value of the first pulse to a predetermined value lower than a value measured upon the detection of separation, the waveform generator generating a third pulse having a pulse shape different in at least one of a pulse peak current and a pulse width from the second pulse to output the generated third pulse to the welding pulse source after a base time of the first pulse if separation of the droplet is not detected within a peak period, a falling slope period, or a base period of the first pulse.

According to the above structure, the welding control apparatus alternately generates the first pulse and the second pulse and outputs the generated pulses to the welding power source under normal conditions, and if a droplet supply regularity is disturbed due to any disturbance, outputs a third pulse different from the second pulse following the first pulse, by use of the waveform generator. The third pulse may be used to forcedly separate a droplet or reshape a droplet to smoothly separate the droplet. Hence, the welding control apparatus of the present invention can reduce a time necessary to return to a normal state if the droplet supply regularity is disturbed, as compared with a conventional apparatus. Therefore, it is possible to reduce amounts of spatters and fumes generated until the apparatus returns to a normal state.

Further, the welding control apparatus of the present invention may be structured such that, if separation of the droplet is detected within a peak period or a falling slope period of the third pulse, the waveform generator immediately switches a current value of the third pulse to a predetermined value lower than a value measured upon the detection of separation and then generates the second pulse and outputs the generated second pulse to the welding power source after a preset period for the predetermined value of the current.

According to the above structure, if a droplet supply regularity is disturbed due to any disturbance, the welding control apparatus outputs a third pulse following the first pulse as a pulse for forcedly separating a droplet, by use of the waveform generator. Then, the welding control apparatus outputs the third pulse and confirms droplet separation and then, outputs the second pulse. Thus, following the second pulse, the apparatus can alternately output the first pulse and the second pulse again. Hence, the welding control apparatus of the present invention can reduce a time necessary to return to a normal state if the droplet supply regularity is disturbed, as compared with a conventional apparatus.

Further, the welding control apparatus may be structured such that if separation of the droplet is not detected within a peak period or a falling slope period of the third pulse, the waveform generator repeatedly and continuously generates the third pulse a preset number of times or less to output the generated third pulse to the welding power source.

According to the above structure, the welding control apparatus can successively output a third pulse even if droplet separation cannot be confirmed after outputting a third pulse as a pulse for forcedly separating a droplet once. Hence, the welding control apparatus of the present invention can reduce a time necessary to return to a normal state if the droplet supply regularity is disturbed, as compared with a conventional apparatus.

Further, the welding control apparatus may be structured such that the apparatus satisfy such conditions that the first pulse has a peak current Ip1 of 300 to 700 A, the first pulse has a peak period Tp1 of 0.3 to 5.0 ms, the first pulse has a base current Ib1 of 30 to 200 A, the first pulse has a base period Tb1 of 0.3 to 10 ms, the second pulse has a peak current Tp2 that satisfies a condition of Ip2<Ip1 and ranges from 200 to 600 A, the second pulse has a peak period Tp2 of 1.0 to 15 ms, the second pulse has a base current Ib2 of 30 to 200 A, and the second pulse has a base period Tb2 of 3.0 to 20 ms, the predetermined value for the third pulse corresponds to a base current that is a current value in a base period of the third pulse, the preset period is the base period of the third pulse, the third pulse has a peak current Ip3 of 300 to 700 A, the third pulse has a rising slope period Tu3 of 5.0 ms or less, the third pulse has a peak period Tp3 of 0.3 to 5.0 ms, the third pulse has a falling slope period Td3 of 10.0 ms or less, the third pulse has a base current Ib3 of 30 to 200 A, and the third pulse has a base period Tb3 of 0.3 to 10 ms.

According to this structure, the welding control apparatus generates a third pulse having a peak current Ip3 or a peak period Tp3 satisfying preset conditions to thereby contribute to an operation of securing electromagnetic pinch force enough to separate a droplet in accordance with the third pulse. Moreover, the welding control apparatus generates a third pulse having a rising slope period Tu3 or a falling slope period Td3 satisfying preset conditions to thereby contribute to an operation of preventing a rapid change in arc force or electromagnetic pinch force and an operation of gradually moving a generation point of the arc by use of the third pulse. Further, the welding control apparatus generates a third pulse having a base current Ib3 or a base period Tb3 satisfying preset conditions to thereby contribute to an operation of preventing interruption of the arc and suppressing an amount of small spatters in the process for moving the arc to the wire side after the droplet separation.

Further, the welding control apparatus may be structured such that if separation of the droplet is not detected in a peak period, a falling slope period, or a base period of the third pulse, the waveform generator generates the first pulse and outputs the generated first pulse to the welding power source after the base period of the third pulse.

According to the above structure, if a droplet supply regularity is disturbed due to any disturbance, the welding control apparatus outputs a third pulse as a pulse for reshaping a droplet to smoothly separate the droplet. Then, if droplet separation is not detected until the end of the base period of the third pulse after outputting the third pulse, the welding control apparatus outputs a generally used first pulse following the third pulse to separate a droplet. Therefore, once the droplet reshaped in accordance with the third pulse is separated using the first pulse, the first pulse and the second pulse can be alternately output. Hence, the welding control apparatus of the present invention can reduce a time necessary to return to a normal state if the droplet supply regularity is disturbed, as compared with a conventional apparatus.

Further, the welding control apparatus may be structured such that the apparatus satisfies such conditions that the first pulse has a peak current Ip1 of 300 to 700 A, the first pulse has a peak period Tp1 of 0.3 to 5.0 ms, the first pulse has a base period Ib1 of 30 to 200 A, the first pulse base period Tb1 of 0.3 to 10 ms, the second pulse has a peak current Ip2 that satisfies a condition of Ip2<Ip1 and ranges from 200 to 600 A, the second pulse has a peak period Tp2 of 1.0 to 15 ms, the second pulse has a base current Ib2 of 30 to 200 A, the second pulse has a base period Tb2 of 3.0 to 20 ms, the third pulse has a peak current Ip3 of 100 to 400 A, the third pulse has a peak period Tp3 of 0.3 to 10.0 ms, the third pulse has a base current Ib3 of 30 to 200 A, and the third pulse has a base period Tb3 of 0.3 to 15 ms.

According to this structure, the welding control apparatus generates a third pulse having a peak current Ip3 or a peak period Tp3 satisfying preset conditions to thereby contribute to an operation of stably forming a droplet in the process for reshaping a droplet. Moreover, the welding control apparatus generates a third pulse having a peak current Ip3 or a peak period Tp3 satisfying preset conditions to thereby contribute to an operation of stably shaping a droplet without interrupting the arc.

The present invention provides a welding control method for a welding control apparatus used for arc welding with a single carbon dioxide gas or a mixed gas mainly containing the carbon dioxide gas being used as a shielding gas, the welding control apparatus including: a droplet separation detecting unit that detects separation of a droplet from a tip end of welding wire; and a waveform generator that alternately generates a first pulse for separating the droplet and a second pulse for shaping the droplet and outputs the generated pulse to a welding power source, and if separation of the droplet is detected, immediately switches a current value of the first pulse to a predetermined value lower than a value measured upon the detection of separation, wherein if separation of the droplet is not detected within a peak period, a falling slope period, or a base period of the first pulse by the droplet separation detecting unit, the welding control apparatus generates a third pulse having a pulse shape different in at least one of a pulse peak current and a pulse width from the second pulse to output the generated third pulse to the welding pulse source after a base time of the first pulse to thereby restore a droplet supply regularity by use of the waveform generator.

According to this procedure, the welding control apparatus alternately generates the first pulse and the second pulse and outputs the generated pulses to the welding power source under normal conditions, and if a droplet supply regularity is disturbed due to any disturbance, outputs a third pulse different from the second pulse following the first pulse, by use of the waveform generator. Hence, the welding control method of the present invention can reduce a time necessary to return to a normal state if the droplet supply regularity is disturbed, as compared with a conventional apparatus. Therefore, it is possible to reduce amounts of spatters and fumes generated until the apparatus returns to a normal state.

According to the present invention, if a droplet supply regularity is disturbed due to any disturbance, the welding control apparatus outputs a third pulse different from the second pulse following the first pulse for separating a droplet as a pulse for reshaping a droplet. Hence, the welding control apparatus of the present invention can shorten a time necessary to return to a normal state as compared with a conventional apparatus. Thus, it is possible to reduce amounts of spatters and fumes generated until the apparatus returns to a normal state. Even if the droplet supply regularity is disturbed due to the above operation, reduction in welding quality can be minimized.

BRIEF DESCRIPTION OF THE DRAWINGS

FIGS. 9A to 9C are graphs illustrating how the welding control apparatus of the present invention detects separation of a droplet, in which FIG. 9A shows a change in welding voltage over time, FIG. 9B shows a change in one-stage temporal differentiation of a welding voltage over time, and FIG. 9C shows a change in two-stage temporal differentiation of a welding voltage over time;

FIGS. 12A and 12B illustrate a spatter trapping method for measuring an amount of spatters with the welding control apparatus of the present invention, in which FIG. 12A is a front perspective view of a collection box and FIG. 12B is a perspective view of an inner portion of the collection box as viewed from the side;

FIG. 13 shows waveforms and parameter values of a first pulse and a second pulse generated upon measuring an amount of spatters with the welding control apparatus of the present invention;

FIG. 14 is an explanatory view schematically showing how a welding wire tip end portion is changed over time in accordance with a pulse waveform generated by a conventional pulse arc welding method; and FIG. 15 is an explanatory view schematically showing waveforms of a first pulse and a second pulse generated with a conventional pulse arc welding method.

DESCRIPTION OF THE PREFERRED EMBODIMENTS

Hereinafter, the best modes for carrying out a welding control apparatus and method (hereinafter referred to as "embodiment") according to the present invention will be described with reference to the accompanying drawings. To begin with, a summary of the welding control method of the present invention and two examples of the welding control method are described and then, features relative to a conventional technique, and the structure and operation of the welding control apparatus that realizes the welding control method of the present invention are further described.

[Summary of Welding Control Method]

Figure 1:
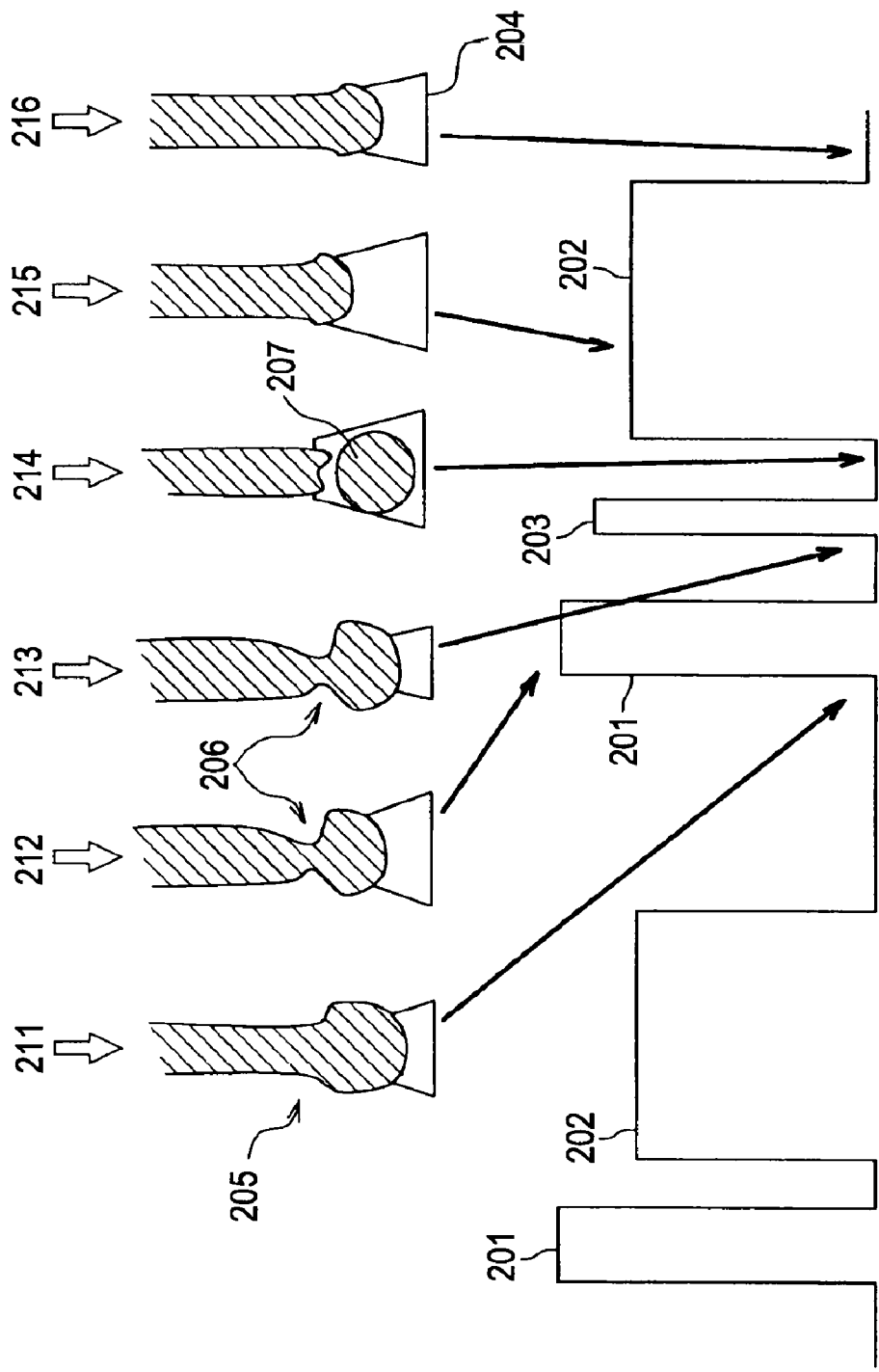
FIG. 1 is an explanatory view schematically showing how a tip end of welding wire is changed over time in accordance with a pulse waveform generated with a welding control apparatus according to the present invention.
Figure 2:
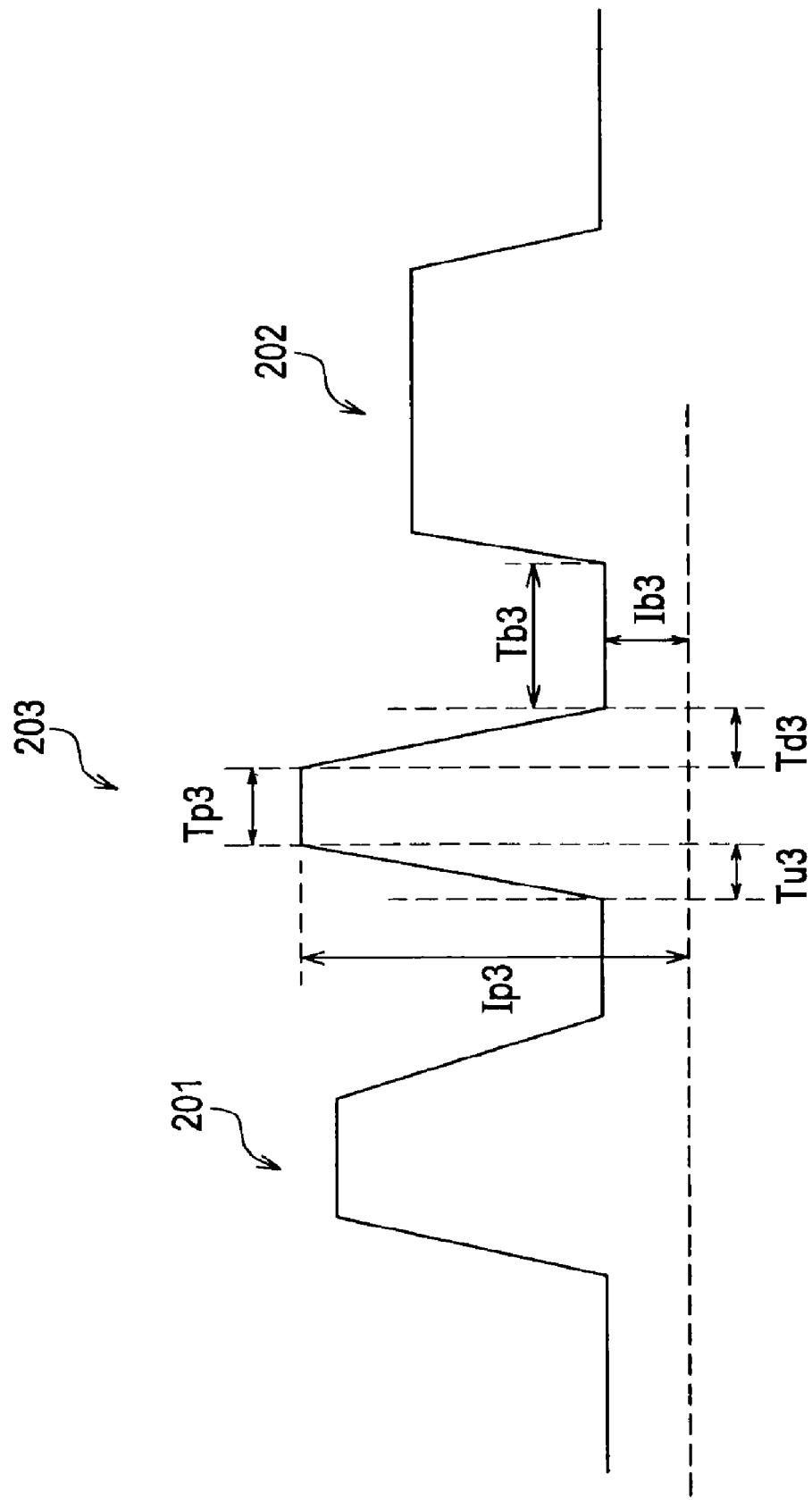
FIG. 2 is an explanatory view schematically showing a waveform of a third pulse generated with the welding control apparatus of the present invention.

FIG. 1 is an explanatory view schematically showing how a tip end of welding wire is changed over time in accordance with a pulse waveform generated with the welding control apparatus of the present invention. The welding control apparatus of the present invention carries out arc welding with a single carbon dioxide gas or a mixed gas mainly containing the carbon dioxide gas being used as a shielding gas while conforming to a droplet supply regularity that one droplet is supplied at each period based on a pulse current (pulse signal). As shown in a lower portion of FIG. 1, under normal conditions, the welding control apparatus of the present invention alternately generates two kinds of pulse current (pulse signals) different in pulse waveform, that is, a first pulse 201 and a second pulse 202 and outputs the generated pulse signals to a welding power source. FIG. 2 is a detailed waveform chart of the first pulse 201 and the second pulse 202. Pulse parameters of the first pulse 201 and the second pulse 202 are set to satisfy conditions described with reference to FIG. 1.

If pulse arc welding is carried out under such conditions, a wire tip end 205 of welding wire (hereinafter simply referred to as "wire") that induces an arc 204 between the wire and a welding material (not shown) is constricted into a droplet and then drops as shown in an upper time-series diagram of FIG. 1. First of all, 211 indicates a state of a droplet from a second pulse peak period in which the droplet grows at the wire tip end 205 after separation of a droplet formed in a previous pulse period up to late second pulse base period. At this time, since a current value rapidly decreases from a second pulse peak current to a second pulse base current, an upward force is weakened at the wire tip end 205, and the droplet is shaped to hang down at the wire tip end 205 as indicated by 211. Subsequently, in a first pulse peak period, the droplet deforms to form a constriction 206 by means of an electromagnetic pinch force generated by a peak current in the wire as indicated by 212.

Here, it is assumed that separation of a droplet is not detected in a first pulse peak period, a first pulse falling slope period, or a first pulse base period due to, for example, any disturbance such as a change in wire supply rate or weld pool. In the illustrated example of FIG. 1, separation of a droplet is not detected in a first pulse base period as indicated by 213. In this way, if separation of a droplet is not detected in the first pulse peak period, the first pulse falling slope period, or the first pulse base period, the welding control apparatus of the present invention generates a third pulse 203 as a pulse current (pulse signal) having a pulse shape different from the second pulse 202 in pulse peak current and/or pulse width after the first pulse base period, and outputs the generated pulse to the welding power source. The differences in pulse shape are described below.

The third pulse is output for the purpose of restoring a droplet supply regularity that one droplet is supplied at each period and quickly returning to a normal state. Two solutions thereto are conceivable. The first solution is a method for forcedly separating a droplet that failed to separate from the wire tip end 205 by means of the third pulse to output the second pulse following the third pulse. The second solution is a method for reshaping a droplet that failed to separate from the wire tip end 205 by means of the third pulse and separating the droplet by means of the first pulse that is output following the third pulse. The welding control apparatus of the present invention outputs a third pulse having a waveform suitable for the first and second methods as described later. More specifically, as shown in FIG. 2, the waveform of the third pulse 203 includes a rising slope period Tu3 involving a current level change from a base current Ib3 to a peak current Ip3 and a falling slope period Td3 involving a current level change from a peak current Ip3 to a base current Ib3.

[Summary of First Method]

According to the first method, a peak current (third pulse peak current) of the third pulse is set higher than a second pulse peak current as shown in FIG. 1, for example. This is referred to as a first example of the third pulse. With this operation, the third pulse can forcedly separate a droplet that failed to separate from the wire tip end 205 as indicated by 214. In this case, when detecting separation of a droplet 207 from the wire tip end 205, the welding control apparatus rapidly lowers a current value, for example, from a current measured upon the detection to a third pulse base current as shown in FIG. 1. Then, at the instance when the arc is moved toward the wire from which the droplet was separated, the apparatus shifts a current period to the third pulse base period as indicated by 214 to thereby substantially reduce a current value. As a result, it is possible to considerably reduce an amount of small spatters generated due to flying spray of the wire at the constriction 206 or flying spray of residual melt after separation.

Further, in the case of outputting the second pulse following the third pulse, in the second pulse peak period, the welding control apparatus sets the second pulse peak current to such a level that prevents release or flying spray of melt residual in the wire from which the droplet was separated, and allows the droplet to grow using this second pulse as indicated by 215. Then, the welding control apparatus shapes the droplet in the second pulse base period as indicated by 216. Following this, the process for shaping the droplet starts again from the state 211. Thus, the welding control apparatus can restore a droplet supply regularity and return to a normal state more quickly than a conventional apparatus.

[Summary of Second Method]

According to second method, a peak current (third pulse peak current) of the third pulse is set lower than a second pulse peak current, for example. This is referred to as a second example of the third pulse. With this operation, the third pulse can shape a droplet that failed to separate from the wire tip end 205 such that the droplet hangs down from the wire tip end 205 as indicated by 211. Then, in the case of outputting the first pulse following the third pulse, in the first pulse peak period, the droplet rapidly separates by means of an electromagnetic pinch force generated by a peak current in the wire while deforming to form a constriction 206 as indicated by 212. From then on, the second pulse and the first pulse can be alternately output to thereby restore the droplet supply regularity.

[Preferred Parameter Condition of First Method]

The conditions described in US Patent Unexamined Application Publication No. 2007/210048 are preferably used as parameter conditions of the first pulse and the second pulse. To be specific, the first pulse 901 has a peak current (first pulse peak current) Ip1 of 300 to 700 A and a corresponding period (first pulse peak period) Tp1 of 0.3 to 5.0 ms, and a base current (first pulse base period) Ib1 of 30 to 200 A and a corresponding period (first pulse base period) Tb1 of 0.3 to 10 ms. Further, the second pulse 902 has a peak current (second pulse peak current) Ip2 that satisfies a condition of Ip2<Ip1 and ranges from 200 to 600 A and a corresponding period (second pulse peak period) Tp2 of 1.0 to 15 ms, and a base current (second pulse base current) Ib2 of 30 to 200 A and a corresponding period (second pulse base period) Tb2 of 3.0 to 20 ms. More specifically, the waveform of the first pulse 901 and the second pulse 902 include rising slope periods (a first pulse rising slope period Tup 1 and a second pulse rising slope period Tup 2) involving a current level change from a base current to a peak current and a falling slope period (Tdown) involving a current level change from a peak current to a base current as shown in FIG. 15.

Here, the parameter conditions are preferred examples of the conditions for the first and second pulses, and the present invention is not limited thereto. In short, the pulse waveforms of the first and second pulses may be set in accordance with the function of separating a droplet and the function of shaping a droplet.

As for the first method, it is preferred to set pulse parameter conditions for the first example of the third pulse illustrated in the waveform chart of FIG. 2 as follows so as to forcedly separate a droplet that failed to separate.

<Peak Current Ip3>

A peak current (third pulse peak current) Ip3 is set to 300 to 700 A. The peak current Ip3 significantly contributes to generation of electromagnetic pinch force enough to separate a droplet. If the peak current Ip3 is less than 300 A, the electromagnetic pinch force is weak, and the droplet supply regularity cannot be restored. On the other hand, if the peak current Ip3 exceeds 700 A, an arc force that pushes up a droplet becomes too strong, which involves a problem of increasing apparatus weight and cost as well as a possibility that the separated droplet is turned into spatters. The peak current Ip3 is more preferably 400 to 600 A.

<Rising Slope Period Tu3>

The rising slope period (third pulse rising slope period) Tu3 is set to 5.0 ms or less. The rising slope period Tu3 contributes to an operation of preventing rapid increase in arc force and gradually shifting an arc generation point toward an upper portion of a droplet. With this operation, a droplet can more securely separate in accordance with the third pulse. If the rising slope period Tu3 exceeds 5.0 ms, an arc force for pushing up the droplet undesirably becomes stronger than an electromagnetic pinch force for separating the droplet, and the separated droplet is more likely to be turned into spatters.

<Peak Period Tp3>

The peak period (third pulse peak period) Tp3 is set to 0.3 to 5.0 ms. The peak period Tp3 contributes to generation of an electromagnetic pinch force enough to separate a droplet similar to the peak current Ip3. If the peak period (pulse width) Tp3 is less than 0.3 ms, the electromagnetic pinch force cannot separate the droplet, and the droplet supply regularity cannot be restored. On the other hand, in the case where the peak period Tp3 exceeds 5.0 ms, the arc force largely pushes up the droplet and thus, even if a current value is lowered immediately from a current value measured upon the detection of separation to the base current Ib3, it is difficult to achieve an effect of suppressing small spatters.

<Falling Slope Period Td3>

The falling slope period (third pulse falling slope period) Td3 is set to 10.0 ms or less. The falling slope period Td3 contributes to an operation of preventing rapid reduction in pinch force in a process of changing a current level from the peak current Ip3 to the base current Ib3. Assuming that the waveform of the third pulse is shifted to the base current Ib3 during the separation of the droplet, the droplet might fail to separate. However, since the condition that the falling slope period Td3 is 10.0 ms or less is satisfied, a rate of droplet separation failures can be remarkably reduced. On the other hand, if the falling slope period Td3 exceeds 10.0 ms, separation of a droplet occurs with a relatively high current value.

Thus, even if a current value is immediately changed from a current value measured upon the detection of separation down to the base current Ib3, it is difficult to achieve an effect of suppressing small spatters.

<Base Current Ib3>

The base current (third pulse base current) Ib3 is set to 30 to 200 A. The third base current Ib3 largely contributes to suppression of small spatters without interrupting an arc in the process for moving the arc toward the wire after separation of a droplet. If the third base current Ib3 is less than 30 A, the interruption and short-circuit of an arc tend to occur. On the other hand, if the third base current Ib3 exceeds 200 A, at the instance when the arc is moved from the droplet to the wire, an arc force applied to melt residual in the wire increases, and small spatters cannot be suppressed.

<Base Period Tb3>

The base period (third pulse base period) Tb3 is set to 0.3 to 10 ms. The base period Tb3 largely contributes to suppression of small spatters without interrupting an arc in the process for moving the arc toward the wire after separation of a droplet similar to the base current Ib3. The base period Tb3 of less than 0.3 ms is not enough to shape melt residual in the wire, and small spatters cannot be suppressed. On the other hand, if the base period Tb3 exceeds 10 ms, a droplet and a weld pool tend to be short-circuited with each other, and the droplet supply regularity is disturbed. Further, an upper limit of a welding current is lowered, and it is difficult to perform welding with a high wire supply speed.

[Preferred Parameter Condition for Second Method]

Preferred parameter conditions for the first pulse and the second pulse are the same as those of the first method.

As for the second example, it is preferred to set pulse parameter conditions for the second example of the third pulse illustrated in the waveform chart of FIG. 2 as follows so as to reshape a droplet in accordance with the third pulse and separate the droplet in accordance with the first pulse that is output following the third pulse.

<Peak Current Ip3>

The peak current (third pulse peak current) Ip3 is set to 100 to 400 A. The peak current Ip3 largely contributes to an operation of stably shaping a droplet in a process for forming a droplet. If the peak current Ip3 is less than 100 A, an arc force is not enough to push up the droplet again and thus, the droplet cannot separate in accordance with a subsequent first pulse. Further, an upper limit of a welding current is lowered, making it difficult to perform welding under such a condition that the wire is supplied at high speeds. On the other hand, if the peak current Ip3 exceeds 400 A, the wire is molten too much and in addition, an arc force is increased too much. Thus, upon application of the third pulse peak current, a droplet is separated or sprayed to thereby generate spatters. The peak current Ip3 is more preferably 200 to 300 A.

<Peak Period Tp3>

The peak period (third pulse peak period) Tp3 is set to 0.3 to 10.0 ms. The peak period Tp3 largely contributes to an operation of stably shaping a droplet in a process for forming a droplet similar to the peak current Ip3. If the peak period (pulse width) Tp3 is less than 0.3 ms, the droplet can be neither pushed up again nor separated in accordance with a subsequent first pulse. On the other hand, if the peak period Tp3 exceeds 10.0 ms, the wire is molten too much and in addition, the droplet is separated or sprayed to thereby generate spatters during the period of the third pulse, making it impossible to restore the droplet supply regularity that one droplet is supplied at each period.

<Base Current Ib3>

The base current (third pulse base current) Ib3 is set to 30 to 200 A. The third base current Ib3 largely contributes to an operation of stably shaping a droplet in a process for forming a droplet without interrupting the arc. If the third base current Ib3 is less than 30 A, the interruption and short-circuit of the arc tend to occur. On the other hand, if the third base current Ib3 exceeds 200 A, an arc force acting on the droplet increases and in addition, the wire is overmolten in the base period Tb3. As a result, the droplet wobbles and cannot be stably shaped.

<Base Period Tb3>

The base period (third pulse base period) Tb3 is set to 0.3 to 15 ms. This base period Tb3 largely contributes to an operation of stably shaping a droplet in a process for forming a droplet without interrupting the arc similar to the base current Ib3. If the base period Tb3 is less than 0.3 ms, a droplet cannot be shaped well and a direction in which a droplet separated in accordance with a subsequent first pulse is unstable. On the other hand, if the base period Tb3 exceeds 15 ms, the wire is too molten in the base period, and the droplet and the weld pool tend to be short-circuited with each other, making it impossible to restore the droplet supply regularity.

[Summary of Droplet Supply in Case of Disturbance]

Figure 3:
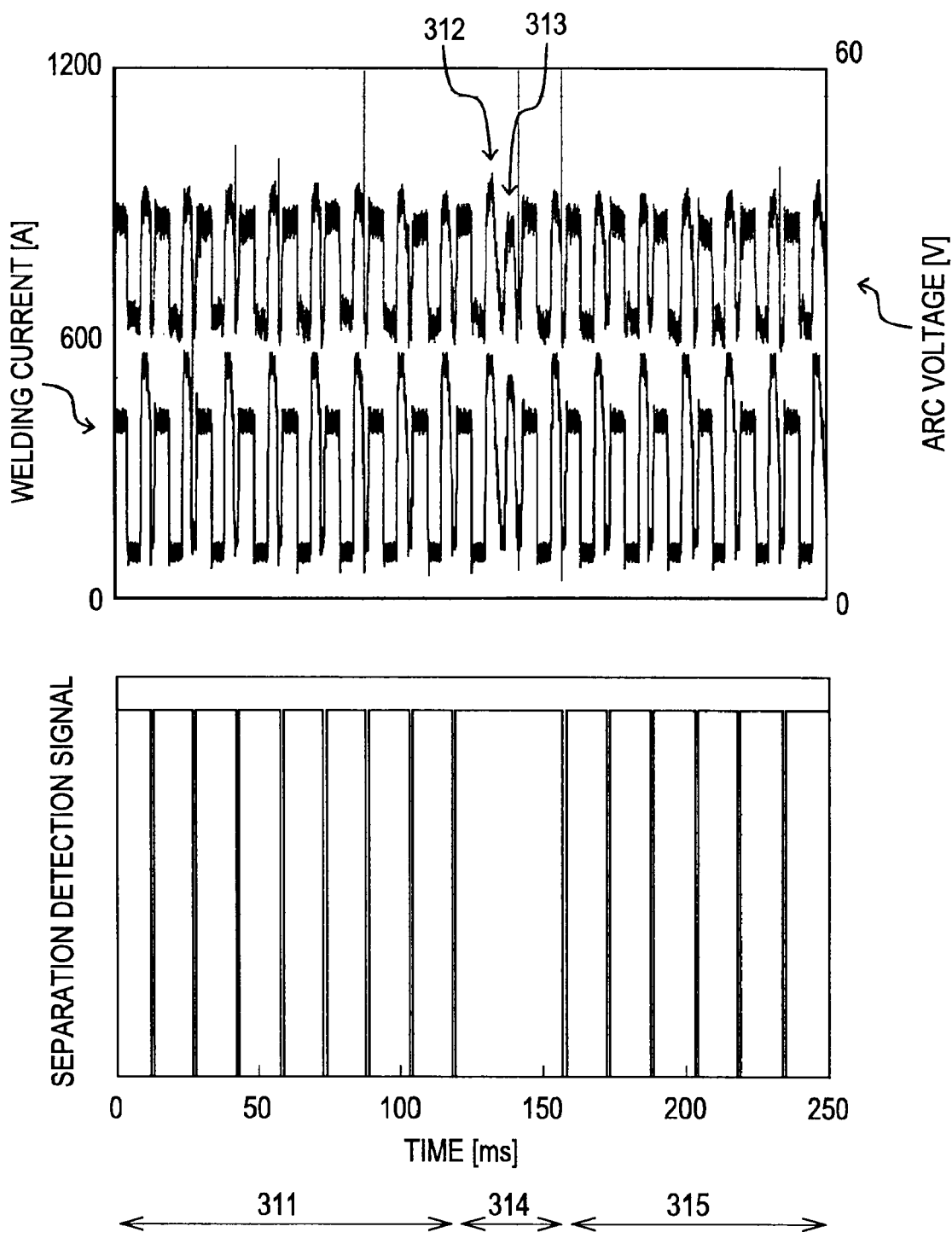
FIG. 3 is a graph illustrating an example of how separation of a droplet is detected with the welding control apparatus of the present invention, which shows waveforms of a welding current and a welding voltage and a separation detection signal.
Figure 4:
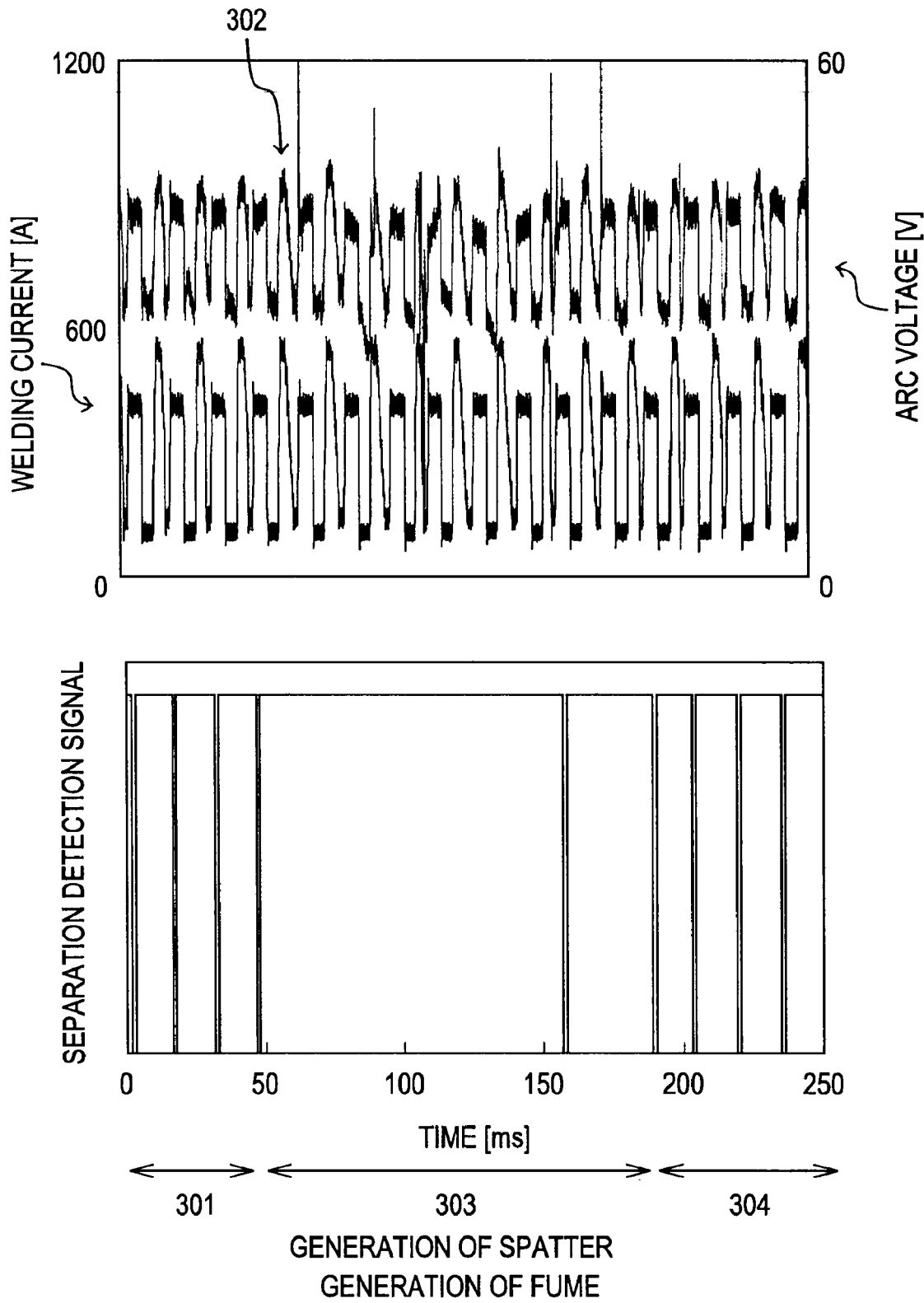
FIG. 4 is a graph as a comparative example of the graph of FIG. 3, which illustrates how separation of a droplet is detected with a conventional welding control apparatus using no third pulse and shows waveforms of a welding current and a welding voltage and a separation detection signal.

Referring to FIGS. 3 and 4, how to supply a droplet in case of disturbance is described based on an example of a pulse waveform obtained upon pulse arc welding under Welding Condition 1 below for the purpose of comparing the welding control method of the present invention with the conventional method. FIG. 3 is a graph illustrating an example of how separation of a droplet is detected with the welding control apparatus of the present invention, which shows waveforms of a welding current and a welding voltage and a separation detection signal. FIG. 4 is a graph as a comparative example of the graph of FIG. 3, which illustrates how separation of a droplet is detected with a conventional welding control apparatus using no third pulse.

(Welding Condition 1)

Wire: JIS Z3312 YGW11 1.2 mmφ
Carbon dioxide gas: 100% $CO_2$
Test plate: SM490 A
Tip-base metal distance: 25 mm
Welding rate: 30 cm/min
Wire supply rate: 16.0 m/min
Welding current: 305 A
Arc voltage: 37 V According to the conventional welding control apparatus, during a period (0 to about 50 ms) indicated by 301 in FIG. 4, a first pulse and a second pulse with a lower peak current than that of the first pulse are alternately output to thereby realize the droplet supply regularity that one droplet is supplied at each period. To be specific, separation is detected four times within four periods. During the period indicated by 301, amounts of spatters and fumes are small. In the graph of FIG. 4, a timing 302 at which the fifth separation would be detected corresponds to a first pulse peak period, a first pulse falling slope period following the first pulse peak period, or a first pulse base period following the first pulse falling slope period. However, if separation of a droplet is not detected due to any disturbance at this timing 302 and no measure is taken, the droplet supply regularity is disturbed in a period (about 50 to about 190 ms) indicated by 303 in FIG. 4. To give a specific example, separation is not detected for six consecutive periods, separation is detected once in a seventh period but is not detected in an eighth period, and a droplet supply regularity is restored as late as a ninth or subsequent period. During the period indicated by 303, amounts of spatters and fumes are increased.

On the other hand, the welding control apparatus of the present invention detects droplet separation eight times within eight periods during a period (0 to about 120 ms) indicated by 311 in FIG. 3 to thereby keep the droplet supply regularity. In the graph of FIG. 3, a timing 312 at which separation in a ninth period would be detected corresponds to a first pulse peak period, a first pulse falling slope period following the first pulse peak period, or a first pulse base period following the first pulse falling slope period. However, since separation of a droplet is not detected at this timing 312 due to any disturbance, the welding control apparatus of the present invention outputs a third pulse at a timing 313 after the first pulse base period. As a result, the droplet supply regularity is restored immediately afterward at a timing when separation in a tenth period would be detected. Therefore, the droplet supply regularity is disturbed for much shorter period than that of the conventional method. As a result, amounts of spatters and fumes are much smaller than the conventional method.

[Droplet Supply with First Method]

Figure 5:
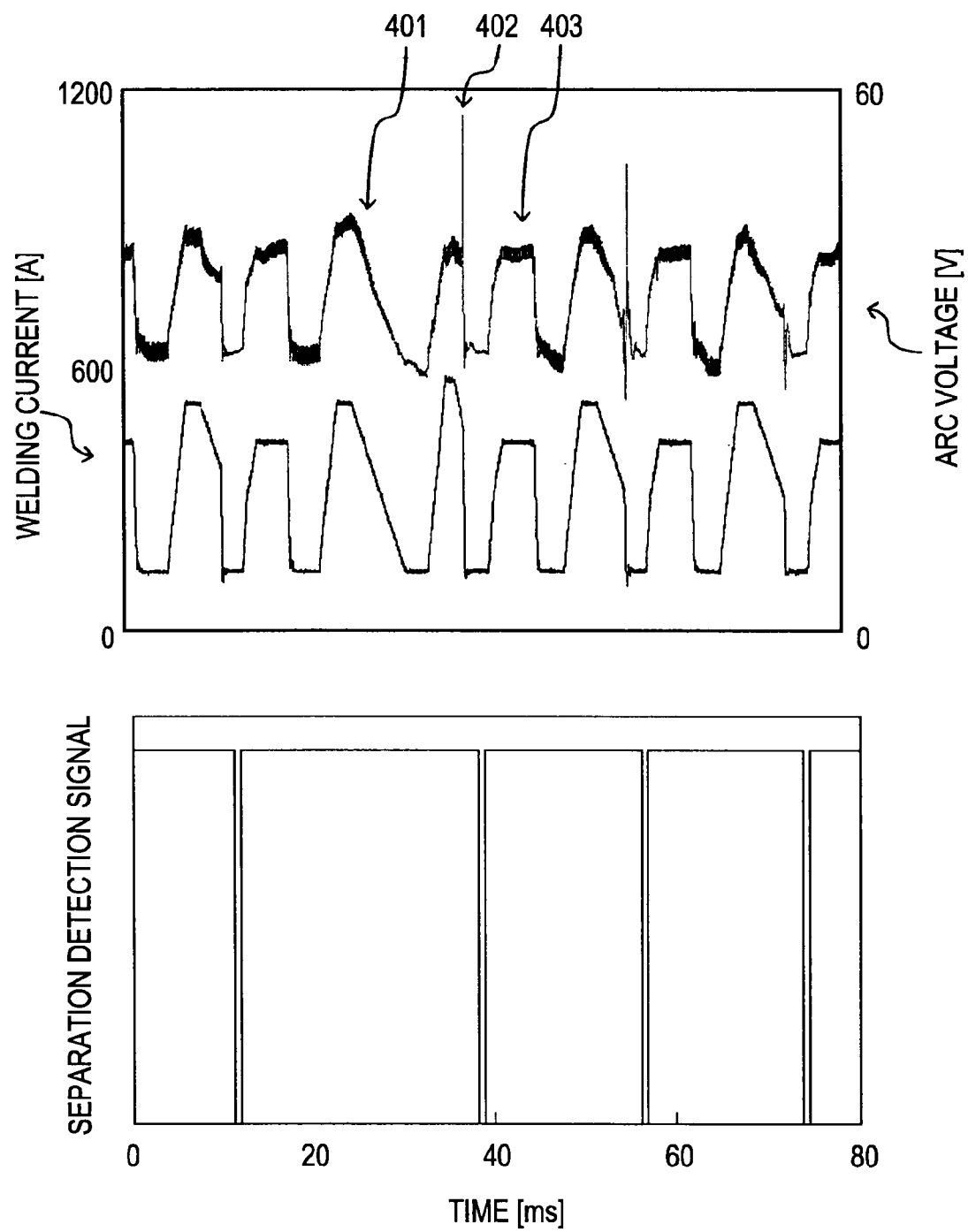
FIG. 5 is a graph illustrating a first example of a third pulse generated with the welding control apparatus of the present invention, which shows waveforms of a welding current and welding voltage and a separation detection signal.

Referring to FIG. 5, a description is given of an example of a pulse waveform obtained through pulse arc welding under Welding Condition 1 above based on the first method. FIG. 5 is a graph illustrating the first example of the third pulse generated with the welding control apparatus of the present invention, which shows waveforms of a welding current and welding voltage and a separation detection signal. In the graph of FIG. 5, a timing 401 corresponds to a reference period of the first pulse for separation detection (a peak period, a falling slope period, and a base period). However, since separation of a droplet is not detected due to any disturbance at this timing 401, the welding control apparatus of the present invention outputs a third pulse after the first pulse base period.

At a timing 402 at which separation of a droplet is detected in a third pulse peak period or a third pulse falling slope period, the welding control apparatus of the present invention switches a current value of the third pulse to a predetermined value lower than a current value measured upon the detection immediately after the detection. Then, after a period preset for the predetermined current value, a second pulse is generated and output to the welding power source as indicated by 403 in FIG. 5. As a result, it is possible to considerably reduce an amount of small spatters generated due to flying spray of wire at a constriction and flying spray of residual melt.

In FIG. 5, separation of a droplet is detected only by outputting one third pulse. In case separation could not be detected, a third pulse may be repeatedly and continuously generated a preset times or less until separation of a droplet is detected, and output to the welding power source. In this case, the condition as to how many times to repeat generation may be set to up to 5 to 6 times. Further, during the third pulse peak period or the third pulse falling slope period, a subsequent third pulse can be output.

[Droplet Supply with Second Method]

Figure 6:
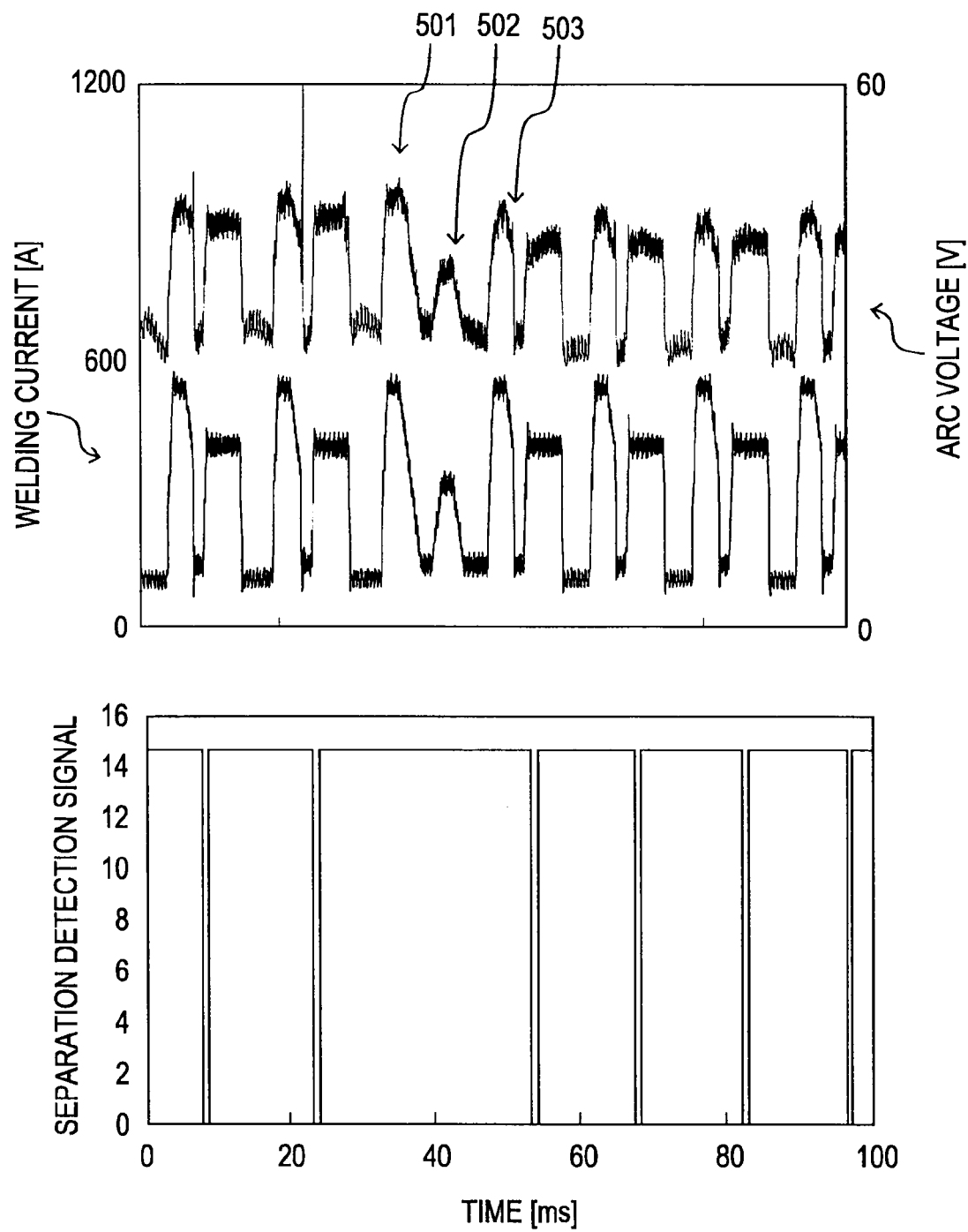
FIG. 6 is a graph illustrating a second example of a third pulse generated with the welding control apparatus of the present invention, which shows waveforms of a welding current and welding voltage and a separation detection signal.

Referring to FIG. 5, a description is given of an example of a pulse waveform obtained through pulse arc welding under Welding Condition 1 above based on the second method. FIG. 6 is a graph illustrating the second example of the third pulse generated with the welding control apparatus of the present invention, which shows waveforms of a welding current and welding voltage and a separation detection signal. In the graph of FIG. 6, a timing 501 corresponds to a reference period of the first pulse for separation detection (a peak period, a falling slope period, and a base period). However, since separation of a droplet is not detected due to any disturbance at this timing 501, the welding control apparatus of the present invention outputs a third pulse to push up the droplet again and shape the droplet after the first pulse base period.

In the graph of FIG. 6, a timing 502 corresponds to any of the third pulse peak period, the third pulse falling slope period, and the third base period. If separation of a droplet is not detected at a timing 502, the welding control apparatus of the present invention generates a first pulse and outputs the generated pulse to the welding power source after the third pulse base period. Then, at a timing 503 at which separation of a droplet is detected, the welding control apparatus of the present invention switches a current value of the first pulse to a predetermined value (first pulse base current) lower than a current value measured upon the detection immediately after the detection in the first pulse peak period or the first pulse falling slope period. Then, after a period (first pulse base period) preset for the predetermined current value (first pulse base current), a second pulse is generated and output to the welding power source. Thus, the droplet supply regularity is not disturbed and amounts of spatters and fumes are not increased.

[Configuration of Welding System]

Figure 7:
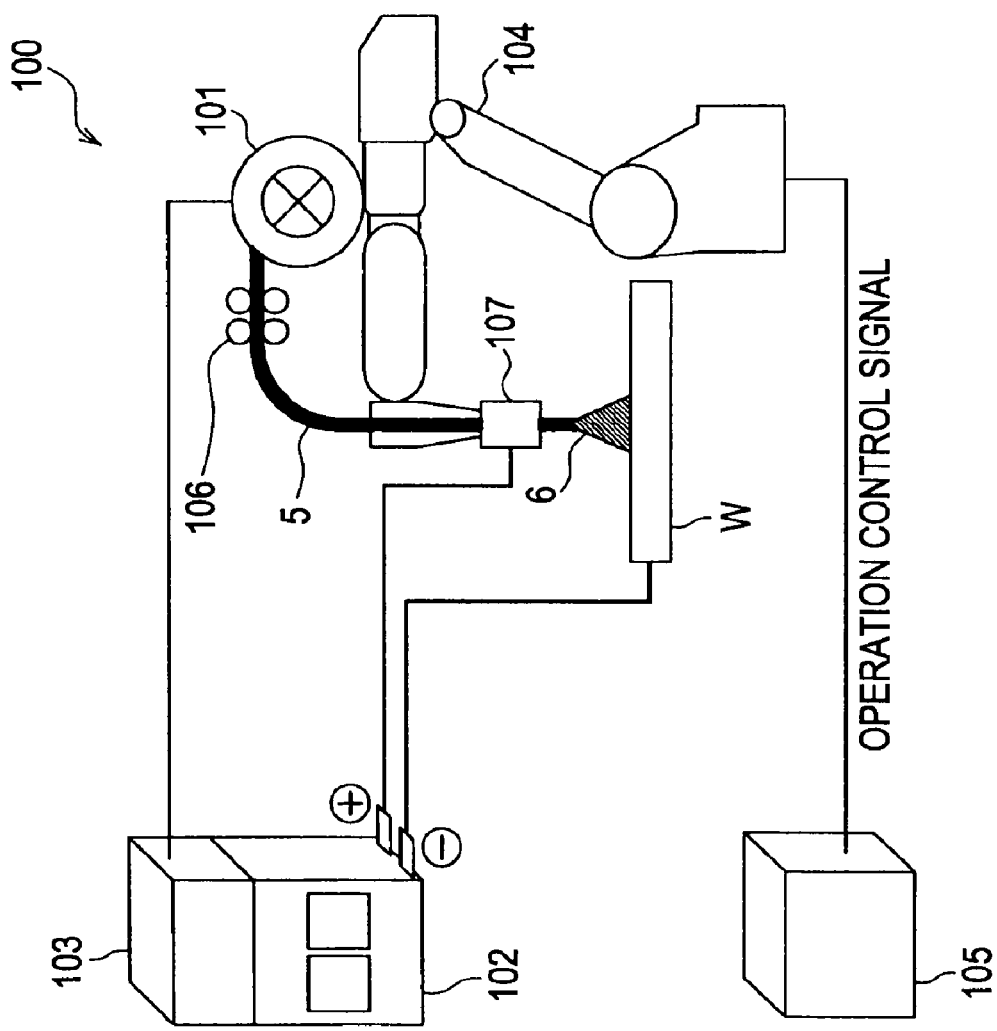
FIG. 7 is a diagram schematically showing an example of a welding system including the welding control apparatus of the present invention.

FIG. 7 is a diagram schematically showing an example of a welding system including the welding control apparatus of the present invention. As shown in FIG. 7, a welding system 100 mainly includes a wire dispenser 101, a welding power source 102, a welding control apparatus 103, an arc welding robot 104, and a robot control device 105.

The wire dispenser 101 is connected to the welding power source 102 through the welding control apparatus 103. The welding power source 102 supplies power to drive the wire dispenser 101. When the welding control apparatus 103 outputs a pulse signal (pulse current) as an instruction signal to execute welding toward the welding power source 102, the welding power source 102 supplies power to drive the wire dispenser 101, and a wire 5 is supplied to a torch 107 through a wire path including a roller for unreeling the wire 5.

The arc welding robot 104 is, for example, a 6-axis multi-joint welding robot, and the torch 107 is attached to the wrist. The arc welding robot 104 can move the torch 107 by moving each joint by means of an internal motor (not shown) in response to an instruction from the robot control device 105. The torch 107 is intended to supply the wire to a welding material W. The arc 6 is generated between the supplied wire and the welding material W to thereby perform welding.

The robot control device 105 is connected to the arc welding robot 104 and a teaching pendant (not shown). The control device controls the arc welding robot 104 based on a welding path or welding operation condition specified by a command (inching instruction) input from the teaching pendant or a prestored predetermined teaching program.

Here, the welding control apparatus 103 and the robot control device 105 include, for example, a CPU (Central Processing Unit), a ROM (Read Only Memory), a RAM (Random Access Memory), an HDD (Hard Disk Drive), and an input/output interface.

[Structure of Welding Control Apparatus]

Figure 8:
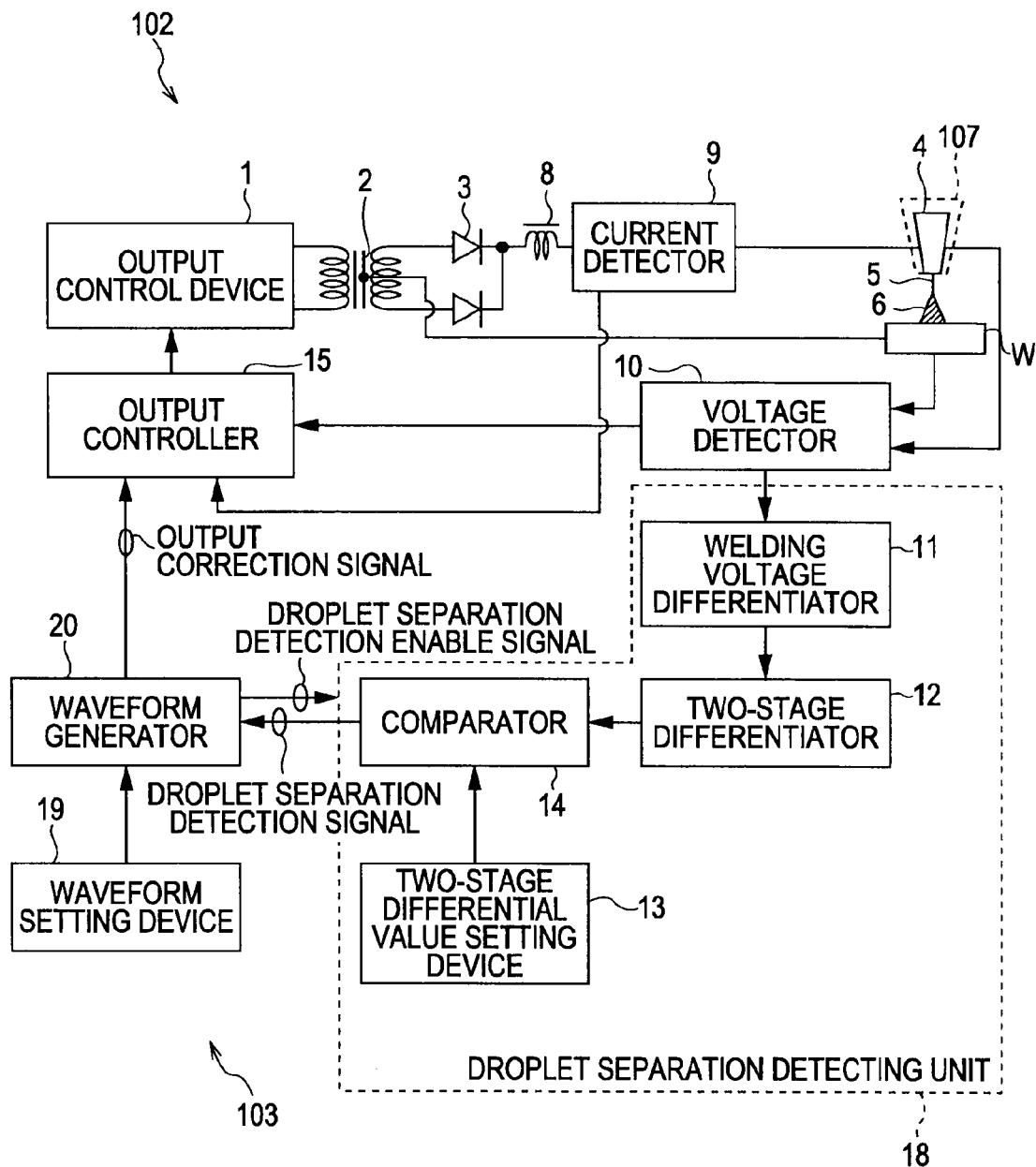
FIG. 8 is a block diagram showing the structure of the welding control apparatus of the present invention.

FIG. 8 is a block diagram showing the structure of the welding control apparatus of the present invention. FIG. 8 shows the welding control apparatus 103 and the welding power source 102 for supplying power to supply the wire 5 to the torch 107 in accordance with a pulse signal (pulse current) output from the welding control apparatus 103. An output control element 1 is connected to a 3-phase AC power source, and a current supplied to the output control element 1 is supplied to a contact tip 4 through a transformer 2, a rectifier 3 composed of a diode, a DC reactor 8, and a current detector 9 for detecting a welding current. As indicated by the broken line, the contact tip 4 is incorporated into the torch 107. The welding material W is connected to a low power source side of the transformer 2, and the arc 6 is generated between the welding material W and the wire 5 inserted through the contact tip 4 and applied with a current. A welding voltage applied between the contact tip 4 and the welding material W is detected by a voltage detector 10 and input to an output controller 15. The output controller 15 also receives a detected value of a welding current from a current detector 9. As a result, the output controller 15 determines values of the welding voltage and welding current to be supplied to the wire 5, based on the input detected values (feedback signals) of welding voltage and welding current and then outputs an instruction signal to control the output control element 1 to thereby control welding output. Further, the output controller 15 controls a pulse arc by changing a signal to be output to the output control element 1 based on signals representing waveforms of first to third pulses input from the waveform generator 20.

A droplet separation detecting unit 18 indicated by the broken line in FIG. 8 detects a state of a droplet ready to separate if predetermined conditions are satisfied. In this embodiment, the droplet separation detecting unit 18 allows processing for detecting a state of a droplet ready to separate only in a period in which a separation detection enable signal is input from the waveform generator 20. Among those conditions, if power source external characteristics are constant voltage characteristics in the third pulse peak period Tp3 (see FIG. 2) or the third pulse falling slope period Td3 (see FIG. 2), for example, a method for detecting separation may detect current decrease when an arc length increases due to separation of a droplet. On the other hand, if power source external characteristics are constant voltage characteristics in the third pulse peak period Tp3 or the first pulse falling slope period Td3, the method may detect rapid increase in arc voltage along with separation of a droplet. Further, a one-stage or two-stage temporal differentiation signal for a welding current, a welding voltage, or an arc resistance (arc impedance=welding voltage/welding current) may be used as a separation detection signal in the third pulse peak period Tp3 or the third pulse falling slope period Td3. In this embodiment, the two-stage temporal differentiation signal is used for detection of droplet separation (or state of a droplet ready to separate) for the following reasons.

Figure 9A:
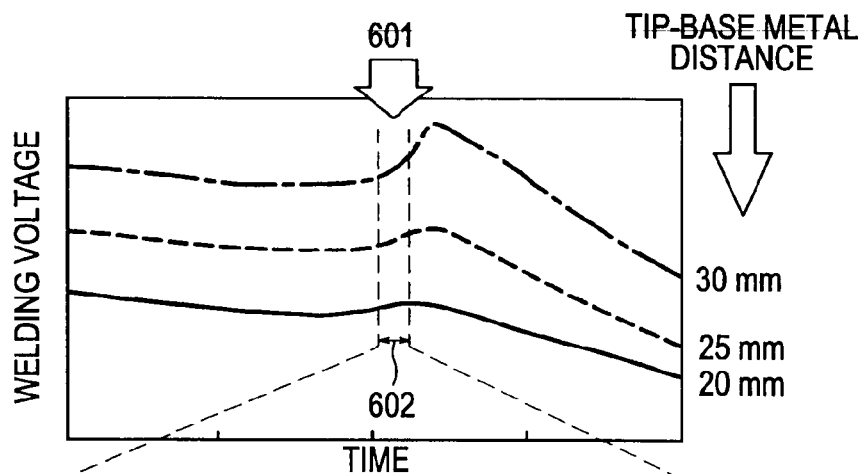
Figure 9B:
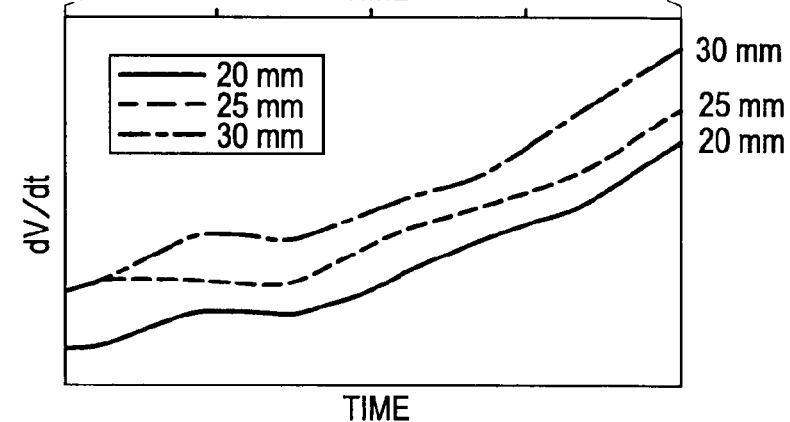
Figure 9C:
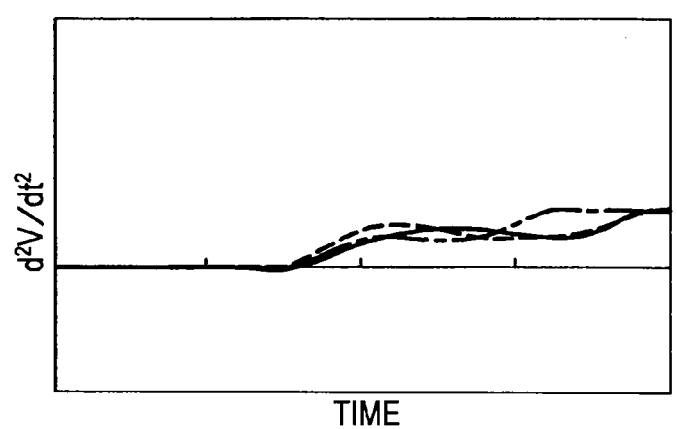

Referring to FIGS. 9A to 9C, the principle for detecting droplet separation is described herebelow. FIGS. 9A to 9C are graphs illustrating how the welding control apparatus of the present invention detects separation of a droplet. FIG. 9A shows a change in welding voltage over time, FIG. 9B shows a change in one-stage temporal differentiation of a welding voltage over time, and FIG. 9C shows a change in two-stage temporal differentiation of a welding voltage over time. When a droplet is separated, a base portion of a droplet at the wire tip end is constricted and the constriction proceeds, with the result that the welding voltage and arc resistance (=welding voltage/welding current) increases. Further, if a droplet is separated, an arc length increases and thus, the welding voltage and arc resistance increases. Moreover, temporal differential value s of the welding voltage or the arc resistance continuously increases. In the graph of FIG. 9A, a droplet separates at a timing indicated by 601. Therefore, at the timing 601, for example, a rapid change over time in slope of a welding voltage waveform as shown in FIG. 9A or a rapid change over time in temporal differential value (dV/dt) of a welding voltage as shown in FIG. 9B is detected and calculated and then compared with a predetermined threshold value to thereby enable determination as to whether the droplet separates. Here, a range of the time axis in FIG. 9B and FIG. 9C corresponds to a time range 602 in FIG. 9A.

However, if welding conditions such as a current or voltage value are changed during the welding process or a length of a protruded portion of the wire is changed through weaving welding in a groove, for example, it is difficult to detect separation of a droplet with accuracy. More specifically, it is assumed that a tip-base metal distance (length of a protruded wire portion) is changed in three steps (30 mm, 25 mm, and 20 mm) during welding. In this case, as shown in FIG. 9A, if the tip-base metal distance is short, a voltage gently rises; if the tip-base metal distance is long, a voltage sharply rises. In this case, a voltage level is also changed.

Therefore, in the case of changing the tip-base metal distance (length of a protruded wire portion) in three steps (30 mm, 25 mm, and 20 mm), as shown in FIG. 9B, a time temporal differentiation (dv/dt) of the voltage also varies. In other words, if the length of a protruded wire portion is changed during welding, a voltage change accompanying droplet separation and a voltage change accompanying a change in protruded portion length occur at the same time, with the result that droplet separation cannot be detected with accuracy. This applies to the case of changing welding conditions as well as the length of protruded wire portion during welding and further applies to the arc resistance as well as the welding voltage.

On the other hand, even if a tip-base metal distance (length of a protruded wire portion) in three steps (30 mm, 25 mm, and 20 mm), a two-stage temporal differential value ($d^2V/dt^2$) of the welding voltage is substantially constant as shown in FIG. 9C. In short, the two-stage temporal differential value ($d^2V/dt^2$) of the welding voltage is not influenced by the length of a protruded wire portion or other such welding conditions so much. To that end, in this embodiment, separation of a droplet (or a state of a droplet ready to separate) is detected by calculating a two-stage temporal differential value of a welding voltage during welding, and just after the detection, a welding current is reduced under control. As a result, even if the length of a protruded wire portion or other such welding conditions are changed during welding, droplet separation can be detected with accuracy.

In this embodiment, as shown in FIG. 8, the droplet separation detecting unit 18 includes a welding voltage differentiator 11, a two-stage differentiator 12, a two-stage differential value setting device 13, and a comparator 14, and executes processing of each unit when a separation detection enable signal is input from the waveform generator 20.

The welding voltage differentiator 11 performs temporal differentiation on a voltage value (welding voltage value during welding) detected by the voltage detector 10. The differential voltage value is further subjected to temporal differentiation by the two-stage differentiator 12, and the resultant two-stage differential value is input to the comparator 14.

The two-stage differential value setting device 13 sets a threshold value correspond to a two-stage differential value (or a two-stage differential value corresponding to a constriction of a droplet ready to separate) of a welding voltage at the time when a droplet separates from the wire tip end, as a two-stage temporal differential value.

The comparator 14 compares a two-stage differential value of a welding voltage value (two-stage differential detection value) obtained during welding, which is input from the two-stage differentiator 12 with a two-stage differential value (two-stage differential set value) set by the two-stage differential value setting device 13. The comparator 14 determines that a droplet separates from the wire tip end (or ready to separate) just when the two-stage differential detection value exceeds the two-stage differential set value, and sends a droplet separation detection signal to that effect toward the waveform generator 20. In other words, the droplet separation detection signal is output when separation of a droplet (or a state of a droplet ready to separate) is detected.

A waveform setting device 19 sets pulse parameters (a peak current, a pulse peak period, a base current, a pulse base period, a rising slope period, and a falling slope period) of the first pulse, the second pulse, and the third pulse in the waveform generator 20. In this embodiment, the waveform setting device 19 inputs values of pulse parameters prestored in a storage unit (not shown) to the waveform generator 20.

The waveform generator 20 alternately generates two kinds of pulse signals different in pulse waveform, that is, a first pulse for separating a droplet and a second pulse for shaping a droplet to output the generated pulses to the welding power source 102. In addition, if separation of a droplet is detected, the generator immediately switches a current value of the first pulse to a predetermined value lower than the current value measured upon the detection. If receiving a droplet separation detection signal from the droplet separation detecting unit 18, the waveform generator 20 outputs a signal (output correction signal) for correcting an output of the output controller 15 toward the output controller 15 based on values preset by the waveform setting device 19 such that the current value is switched to a welding current (first pulse base current) lower than a welding current measured upon the detection in the first pulse base period (output correction period set by the waveform setting device 19). Further, after the first pulse base period (output correction period set by the waveform setting device 19) in response to input of a droplet separation detection signal, the waveform generator 20 outputs a second pulse waveform signal so as to obtain a pulse shape preset by the waveform setting device 19 and then repeats processing of alternately outputting the first pulse and the second pulse again.

Further, if no droplet separation detection signal has been input within the first pulse base period (hereinafter referred to as "first base period") from when the first pulse was output, the waveform generator 20 of this embodiment outputs a third pulse waveform signal so as to obtain a pulse shape set by the waveform setting device 19. This process will be described in detail below together with an operation of the waveform generator 20.

[Operation of Welding Control Apparatus]
(First Method)

Figure 10:
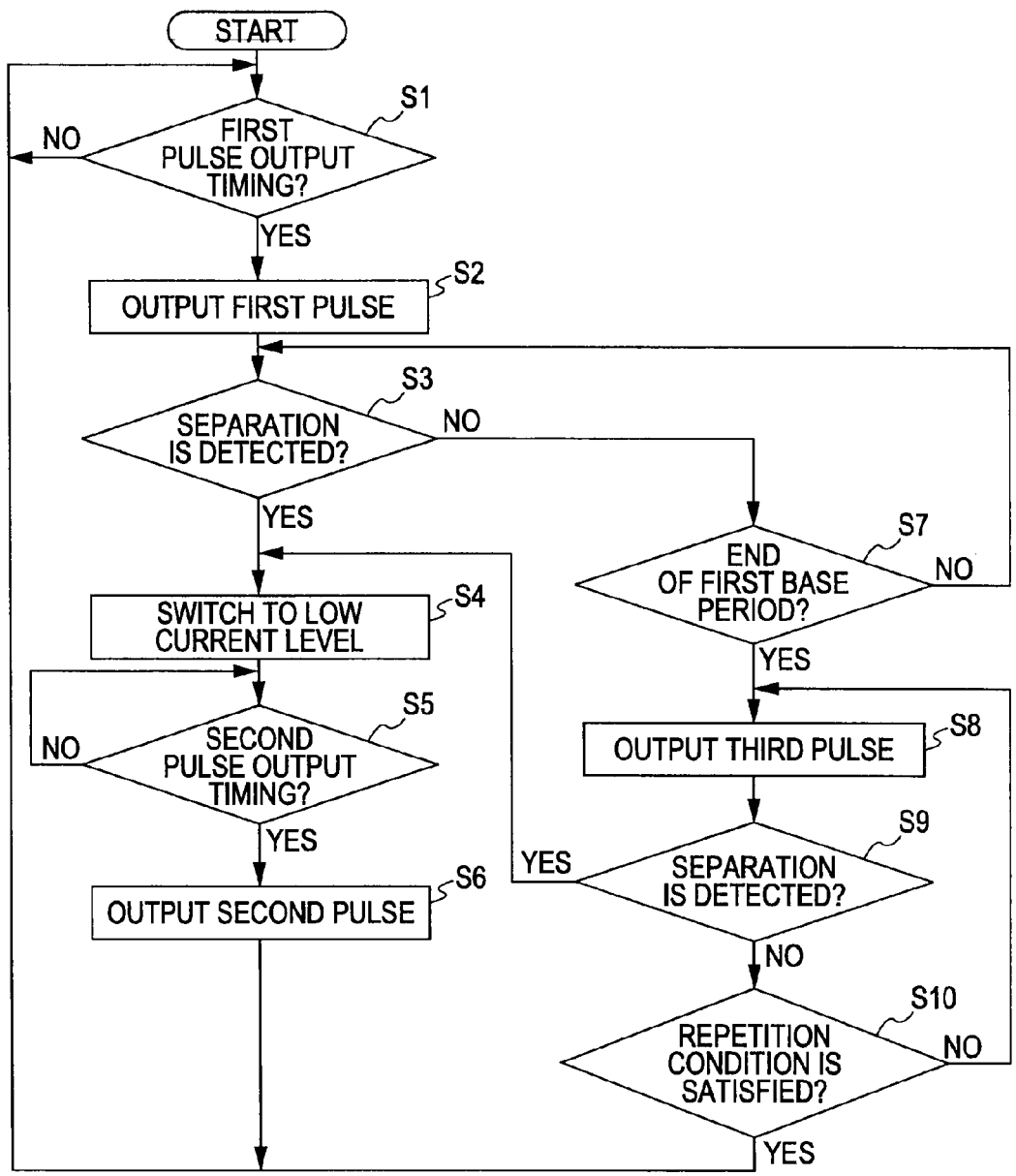
FIG. 10 is a flowchart showing an example of pulse generation processing in the welding control apparatus of the present invention.

Next, a description is focused on pulse generation processing of the waveform generator 20 as an operation of the welding control apparatus 103, which is performed based on the first method of the welding control method of this embodiment with reference to FIG. 10 (also reference to FIG. 8). FIG. 10 is a flowchart showing an example of pulse generation processing in the welding control apparatus of the present invention. The waveform generator 20 of the welding control apparatus 103 waits ready not at an output timing of the first pulse, which is set by the waveform setting device 19 (step S1: NO), and at the output timing of the first pulse (step S1: YES), outputs the first pulse to the output controller 15 (step S2). If the droplet separation detecting unit 18 of the welding control apparatus 103 detects separation of a droplet as usual (step S3: YES), the waveform generator 20 of the welding control apparatus 103 switches a current value to a low current (first pulse base current) based on a droplet separation detection signal (step S4). The waveform generator 20 waits ready not at an output timing of the second pulse, which is preset by the waveform setting device 19 (step S5: NO), and at the output timing of the second pulse (step S5: YES), outputs the second pulse (step S6). Then, the waveform generator 20 returns the processing to step S1. As a result, under normal conditions, the welding control apparatus 103 can keep a droplet supply regularity that one droplet is supplied at each period.

Further, if the droplet separation detecting unit 18 does not detect separation of a droplet for some reason in step S3 although outputting the first pulse for separating a droplet (step S3: NO), the waveform generator 20 repeats determination as to whether droplet separation is detected within the first base period (step S7: NO). If the first base period elapses without detection of droplet separation (step S7: YES), the waveform generator 20 outputs the third pulse to forcedly separate a droplet (step S8). After the third pulse was output, if the droplet separation detecting unit 18 detects separation of a droplet (step S9: YES), the waveform generator 20 returns the processing to step S4 and switches a current value to a low current. At this time, the low current is, for example, a third pulse base current. In other words, the waveform generator 20 outputs a waveform signal of the second pulse following the third pulse so as to obtain a pulse shape preset by the waveform setting device 19 after the third pulse base period (output correction period set by the waveform setting device 19) in response to input of the droplet separation detection signal, and then repeats processing of alternately outputting the first pulse and the second pulse again. As a result, the welding control apparatus 103 can restore the droplet supply regularity.

Further, after the third pulse was output, if the droplet separation detecting unit 18 does not detect separation of a droplet (step S9: NO), in the case where conditions for repeating the operation are not satisfied (step S10: NO), the waveform generator 20 returns to step S8 and repeatedly outputs the third pulse until droplet separation is detected. Then, if droplet separation is not detected and the conditions for repeating the operation are satisfied (step S10: YES), the waveform generator 20 returns to step S1 and outputs a first pulse.

(Second Method)

Figure 11:
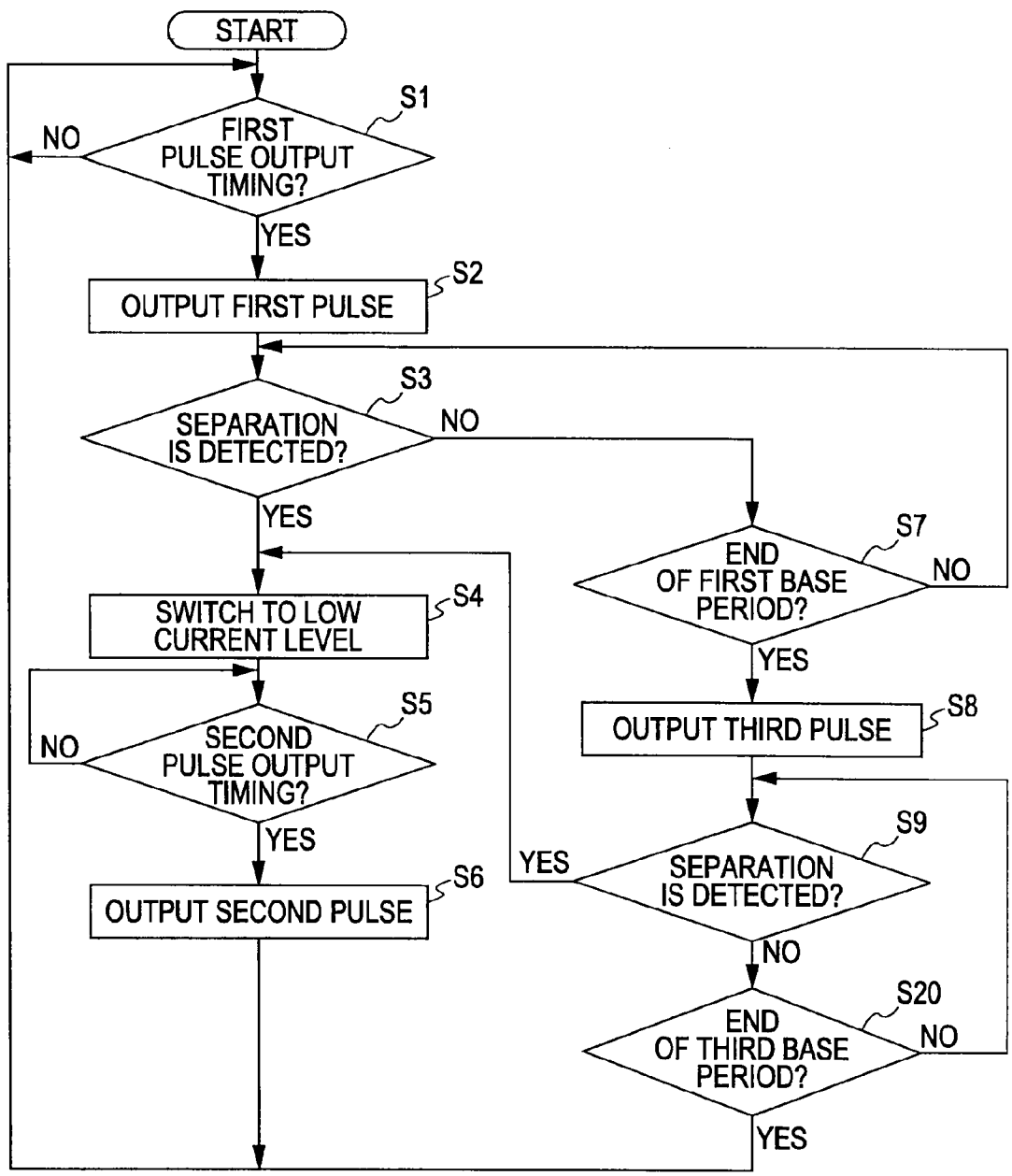
FIG. 11 is a flowchart showing another example of pulse generation processing of the welding control apparatus of the present invention.

Next, referring to FIG. 11 (also to FIGS. 8 and 10), a description is focused on pulse generation processing of the waveform generator 20 as an operation of the welding control apparatus 103, which is performed based on the second method of the welding control method of this embodiment. FIG. 11 is a flowchart showing another example of pulse generation processing of the welding control apparatus of the present invention. Among the operations of the welding control apparatus 103, the operations in steps S1 to S7 are the same as those in FIG. 10 and thus not described.

If the first base period elapses without detection of droplet separation (step S7: YES), the waveform generator 20 of the welding control apparatus 103 outputs the third pulse to reshape a droplet that failed to separate in step S8 (step S8). Then, if the droplet separation detecting unit 18 does not detect separation of droplet after the third pulse was output (step S9: NO), the waveform generator 20 repeats determination as to whether droplet separation is detected, within the third base period (step S20: NO). Then, if the third base period elapses without detection of droplet separation (step S20: YES), the unit returns to step S1 and outputs the first pulse to separate the shaped droplet. In other words, the waveform generator 20 outputs a waveform signal of the first pulse following the third pulse so as to obtain a pulse shape preset by the waveform setting device 19 if the third pulse base period (output correction period set by the waveform setting device 19) elapses without receiving a droplet separation detection signal, and then outputs the second pulse. From then on, a process for alternately outputting the first pulse and the second pulse is repeated again. As a result, the welding control apparatus 103 can restore the droplet supply regularity. Provided that droplet separation is detected in step S9 (step S9: YES), similar to the first method, the unit returns to step S4 and can switch the current value to a low current (for example, a third pulse base current).

The welding control apparatus 103 can be implemented by executing a welding control program that prompts a general computer to function as the above droplet separation detecting unit 18, waveform setting device 19, and waveform generator 20. This control program may be loaded through a communication line or distributed in the form of being written to a recording medium such as a CD-ROM or a flash memory.

According to this embodiment, if droplet separation is not detected due to any disturbance in the first pulse peak period Tp1, the first pulse falling slope period Tdown following the first pulse peak period Tp1, or the first pulse base period Tb1 following the first pulse falling slope period Tdown, the welding control apparatus 103 outputs the third pulse having a pulse shape different from the second pulse after the first pulse base period Tb1. By using the first example of the third pulse, a droplet that failed to separate can be forcedly separated. By using the second example of the third pulse, a droplet that failed to separate can be also reshaped and then forcedly separated in accordance with the first pulse. Accordingly, the welding control apparatus 103 can restore the droplet supply regularity that is distributed due to any disturbance and immediately return to a normal state. As a result, it is possible to reduce large spatters as well as considerably reduce small spatters generated due to flying spray of a constricted portion at the wire tip end upon droplet separation or flying spray of melt residual in the wire after droplet separation based on the droplet supply regularity that one droplet is supplied at each period. Moreover, the droplet supply regularity is achieved to thereby stabilize a welding arc and considerably reduce amounts of spatters and fumes.

The preferred embodiments of the present invention are described above but the present invention is not limited to the embodiments. For example, in the above embodiments, the welding system 100 including the welding control apparatus 103 includes the arc welding robot 104, but robot welding may be omitted in the present invention. For example, welding can be performed manually with a semi-automatic torch by use of the welding control apparatus 103 and the welding power source 102. Further, a shielding gas used for pulse arc welding is not limited to 100% $CO_2$ but may be a mixed gas mainly containing a carbon dioxide gas (50% or more). Further, the mixed gas may contain an inert gas such as Ar.

Further, in this embodiment, the first pulse 201 and the second pulse 202 differ in peak current but may differ in pulse width or differ in both of a peak current and a pulse width. In short, these two kinds of pulses only need to differ in pulse waveform in accordance with the function of separating a droplet and the function of shaping a droplet.

EXAMPLES

To confirm beneficial effects of the present invention, experiments were performed as to the first and second methods of the welding control method according to the embodiment of the present invention.

(Experimental Method for First Method)

Figure 12A:
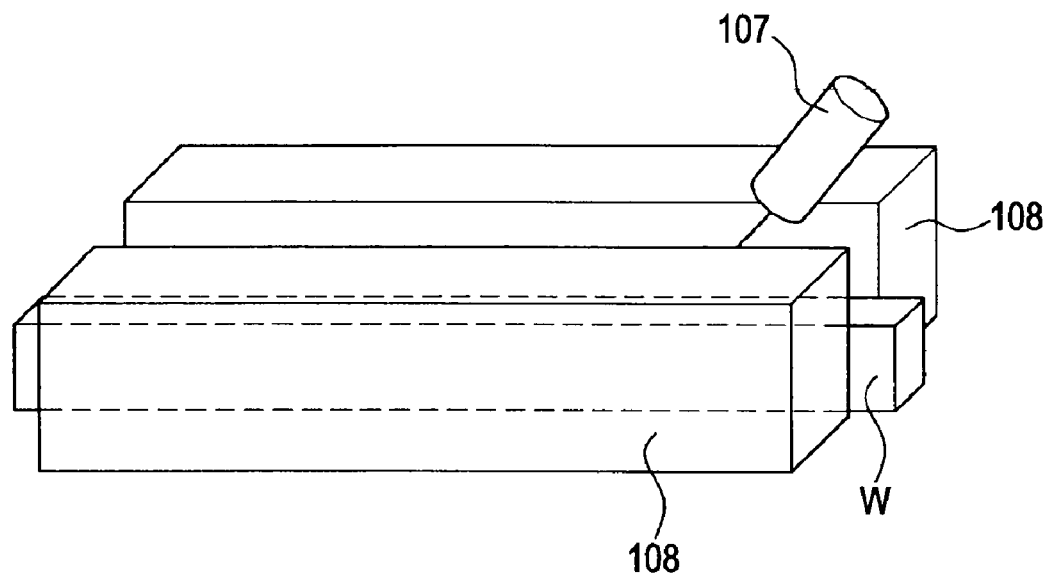
Figure 12B:
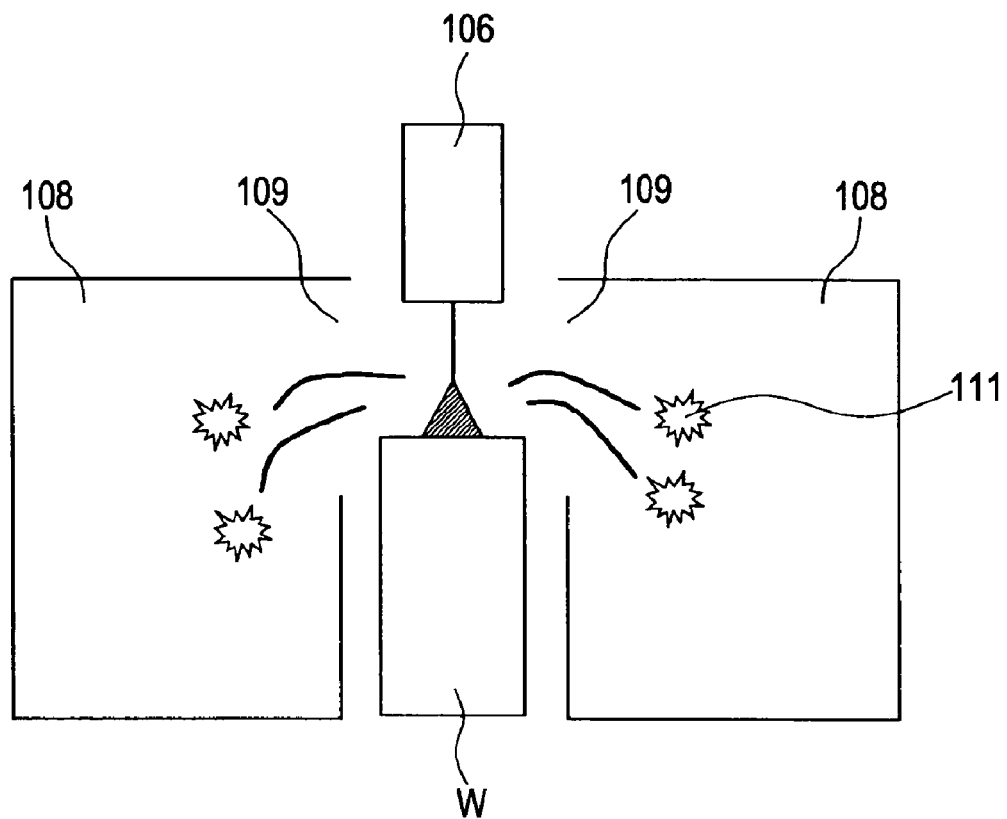

The pulse arc welding was performed with a carbon dioxide gas being used as a shielding gas by using pulse parameters of the third pulse listed in Welding Condition 2 and Tables 1 and 2 below (also refer to FIG. 2) to measure amounts of spatters and fumes. At this time, welding was performed inside a copper-made collection box 108 as shown in FIGS. 12A and 12B to trap spatters. FIGS. 12A and 12B illustrate a spatter trapping method for measuring an amount of spatters with the welding control apparatus of the present invention, in which FIG. 12A is a front perspective view of a collection box and FIG. 12B is a perspective view of an inner portion of the collection box as viewed from the side. A welding material W was placed between the two collection boxes 108, and the torch 107 was placed on the welding material W to execute welding. At this time, generated spatters 111 were trapped into the collection box 108 through an opening 109 formed in an upper portion of the collection box 108. Further, an amount of generated fumes was measured using a method conforming to JIS Z3930. FIG. 13 shows set values of used pulse parameters for the first pulse 201 and the second pulse 202.

(Welding Condition 2)
wire: JIS Z3312 YGW11 1.2 mmφ
carbon dioxide gas: 100% $CO_2$
test plate: SM490 A
tip-base metal distance: 25 mm
torch angle of advance: 30°
welding rate: 40 cm/min

TABLE 1

| No | Ip3 A | Tu3 ms | Tp3 ms | Td3 ms | Ib3 A | Tb3 ms | Spatter amount g/min | Fume amount mg/min | Evaluation |
|---|---|---|---|---|---|---|---|---|---|
| Example 1 | <u>310</u> | 4.1 | 3.0 | 7.5 | 120 | 3.0 | 1.6 | 285 | ⊙ |
| Example 2 | 500 | 3.0 | 2.2 | 4.5 | 150 | 2.0 | 1.9 | 291 | ⊙ |
| Example 3 | <u>690</u> | 1.5 | 1.5 | 5.5 | 160 | 5.5 | 1.1 | 238 | ⊙ |
| Example 4 | 400 | <u>0.3</u> | 3.2 | 3.7 | 50 | 7.2 | 1.7 | 255 | ⊙ |
| Example 5 | 550 | <u>4.9</u> | 2.5 | 8.3 | 90 | 5.8 | 1.3 | 220 | ⊙ |
| Example 6 | 600 | 1.1 | <u>0.3</u> | 5.7 | 120 | 4.5 | 1.8 | 289 | ⊙ |
| Example 7 | 530 | 2.1 | <u>4.9</u> | 2.0 | 70 | 8.3 | 1.9 | 280 | ⊙ |
| Example 8 | 510 | 3.0 | 2.0 | <u>1.0</u> | 150 | 4.1 | 1.4 | 229 | ⊙ |
| Example 9 | 580 | 2.3 | 1.5 | <u>9.5</u> | 90 | 5.3 | 1.6 | 265 | ⊙ |
| Example 10 | 420 | 2.5 | 1.8 | 5.8 | <u>30</u> | 12.1 | 1.4 | 231 | ⊙ |
| Example 11 | 450 | 2.5 | 3.1 | 5.0 | <u>200</u> | 5.0 | 1.8 | 277 | ⊙ |
| Example 12 | 650 | 0.9 | 3.5 | 7.2 | 90 | <u>0.3</u> | 1.9 | 281 | ⊙ |

TABLE 1-continued

| No | Ip3 A | Tu3 ms | Tp3 ms | Td3 ms | Ib3 A | Tb3 ms | Spatter amount g/min | Fume amount mg/min | Evaluation |
|---|---|---|---|---|---|---|---|---|---|
| Example 13 | 590 | 3.0 | 2.9 | 8.5 | 150 | 9.8 | 1.5 | 255 | ⊙ |

TABLE 2

| No | Ip3 A | Tu3 ms | Tp3 ms | Td3 ms | Ib3 A | Tb3 ms | Spatter amount g/min | Fume amount mg/min | Evaluation |
|---|---|---|---|---|---|---|---|---|---|
| Example 14 | 290 | 4.5 | 3.0 | 3.5 | 120 | 3.0 | 2.3 | 315 | ○ |
| Example 15 | 710 | 1.0 | 2.5 | 3.5 | 160 | 4.5 | 2.4 | 335 | ○ |
| Example 16 | 550 | 5.2 | 2.5 | 8.3 | 90 | 5.8 | 2.2 | 303 | ○ |
| Example 17 | 600 | 1.1 | 0.2 | 5.7 | 120 | 4.5 | 2.1 | 319 | ○ |
| Example 18 | 530 | 2.1 | 5.1 | 2.0 | 70 | 8.3 | 2.9 | 352 | ○ |
| Example 19 | 580 | 2.3 | 1.5 | 10.5 | 90 | 5.3 | 2.5 | 341 | ○ |
| Example 20 | 420 | 2.5 | 1.8 | 5.8 | 20 | 12.1 | 2.4 | 326 | ○ |
| Example 21 | 450 | 2.5 | 3.1 | 5.0 | 210 | 5.0 | 2.2 | 327 | ○ |
| Example 22 | 650 | 0.9 | 3.5 | 7.2 | 90 | 0.2 | 2.9 | 387 | ○ |
| Example 23 | 590 | 3.0 | 2.9 | 8.5 | 150 | 10.5 | 2.5 | 350 | ○ |

(Experimental Result of First Method)

In Tables 1 and 2, an amount of generated spatters lower than 4.0 [g/min] and an amount of generated fumes lower than 400 [mg/min] are evaluated as good (○) based on the example in US Patent Unexamined Application Publication No. 2007/210048. As for the amounts evaluated as good (○), an amount of generated spatters lower than 2.0 [g/min] and an amount of generated fumes lower than 300 [mg/min] are evaluated as very good (⊙). In Table 1, Examples 1 to 13 satisfy the preferred parameter conditions for the first method and each evaluated as (⊙). In Table 1, numerical values close to the upper limit or lower limit of the preferred parameter conditions for the first method are underlined.

In Table 2, Examples 14 to 23 have pulse parameters not satisfying the preferred parameter conditions for the first method although the third pulse was used, and are evaluated as good (○). In Table 2, numerical values below the upper limit or above the upper limit of the preferred parameter conditions for the first method are underlined. Further, amounts of spatters and fumes in Examples 14 to 23 are larger than Examples 1 to 13, but an amount of generated spatters is less than 4.0 [g/min] and an amount of generated fumes does not exceed 400 [mg/min].

The reason the amounts of spatters and fumes of Examples 14 to 23 in Table 2 are evaluated as good (○) is as follows.

Example 14

Since Ip3 is equal to or lower than a lower limit of the preferred parameter condition for the first method (hereinafter simply referred to as "lower limit"), a droplet is hard to separate and the regularity that one droplet is supplied at each period cannot be easily restored, leading to an increase in spatter and fume amounts.

Example 15

Since Ip3 is equal to or higher than an upper limit of the preferred parameter condition for the first method (hereinafter simply referred to as "upper limit"), an arc force for pushing up a droplet tends to increase in a peak period, and a separated droplet is turned into spatters and in addition, an amount of fumes increases due to overheating of the droplet.

Example 16

Since Tu3 is equal to or higher than the upper limit, an arc force for pushing up a droplet tends to increase and a separated droplet is easily turned into spatters.

Example 17

Since Tp3 is equal to or lower than the lower limit, a droplet is hard to separate, and the regularity that one droplet is supplied at each period cannot be easily restored, leading to an increase in spatter and fume amounts.

Example 18

Since Tp3 is equal to or higher than the upper limit, droplet separation often occurs in the peak period, and amounts of small spatters and fumes increase and in addition, the regularity that one droplet is supplied at each period cannot be easily restored.

Example 19

Since Td3 is equal to or higher than the upper limit, droplet separation occurs with high current, making it difficult to suppress small spatters.

Example 20

Since Ib3 is equal to or lower than the lower limit, interruption and short-circuit of the arc often occur, and amounts of spatters and fumes increase.

Example 21

Since Ib3 is equal to or higher than the upper limit, at the instance when the arc is moved from the droplet to the wire, melt residual in the wire tends to be blown away, and amounts of small spatters and fumes increase.

Example 22

Since Tb3 is equal to or lower than the lower limit, at the instance when the arc is moved from the droplet to the wire, it is difficult to shape melt residual in the wire side, and amounts of small spatters and fumes increase.

Example 23

Since Tb3 is equal to or higher than the upper limit, a droplet and a weld pool tend to be short-circuited and amounts of small spatters and fumes increase.

(Experimental Method for Second Method)

The pulse arc welding was performed with a carbon dioxide gas being used as a shielding gas by using pulse parameters of the third pulse listed in Welding Condition 2 and Tables 3 and 4 below (also refer to FIG. 2) to measure amounts of spatters and fumes. At this time, an amount of generated spatters was measured using a method illustrated in FIGS. 12A and 12B similar to the experimental method for the first method, and an amount of generated fumes was measured using a method conforming to JIS Z3930. Moreover, the preset values of the pulse parameters for the first pulse 201 and the second pulse 202 were also adopted.

(Welding Condition 2)

TABLE 3

| No | Ip3 A | Tp3 ms | Ib3 A | Tb3 ms | Spatter amount g/min | Fume amount mg/min | Evaluation |
|---|---|---|---|---|---|---|---|
| Example 24 | <u>110</u> | 8.0 | 120 | 4.0 | 1.8 | 292 | ⊙ |
| Example 25 | <u>390</u> | 2.5 | 160 | 6.5 | 1.5 | 245 | ⊙ |
| Example 26 | 350 | <u>0.3</u> | 120 | 4.5 | 1.2 | 231 | ⊙ |
| Example 27 | 150 | <u>9.9</u> | 70 | 8.3 | 1.8 | 272 | ⊙ |
| Example 28 | 320 | 1.8 | <u>30</u> | 12.1 | 1.4 | 231 | ⊙ |
| Example 29 | 150 | 7.1 | <u>200</u> | 5.0 | 1.8 | 259 | ⊙ |
| Example 30 | 350 | 3.5 | 90 | <u>0.3</u> | 1.9 | 290 | ⊙ |
| Example 31 | 280 | 2.9 | 150 | <u>14.8</u> | 1.5 | 275 | ⊙ |

TABLE 4

| No | Ip3 A | Tp3 ms | Ib3 A | Tb3 ms | Spatter amount g/min | Fume amount mg/min | Evaluation |
|---|---|---|---|---|---|---|---|
| Example 32 | <u>90</u> | 8.5 | 130 | 3.0 | 2.2 | 318 | ◯ |
| Example 33 | <u>420</u> | 2.5 | 160 | 6.5 | 2.3 | 345 | ◯ |
| Example 34 | 350 | <u>0.2</u> | 120 | 4.5 | 2.2 | 324 | ◯ |
| Example 35 | 150 | <u>10.5</u> | 70 | 8.3 | 2.4 | 342 | ◯ |
| Example 36 | 320 | 1.8 | <u>20</u> | 12.1 | 2.1 | 309 | ◯ |
| Example 37 | 150 | 7.1 | <u>210</u> | 5.0 | 2.2 | 321 | ◯ |
| Example 38 | 350 | 3.5 | 90 | <u>0.2</u> | 2.5 | 341 | ◯ |
| Example 39 | 280 | 2.9 | 150 | <u>15.2</u> | 2.8 | 365 | ◯ |

(Experimental Result of Second Method)

In Tables 3 and 4, similar to the evaluation criteria for the first method, an amount of generated spatters was evaluated. Examples 24 to 31 in Table 3 satisfy the preferred parameter conditions for the second method and each evaluated as (⊙). In Table 3, numerical values close to the upper limit or lower limit of the preferred parameter conditions for the second method are underlined.

In Table 4, Examples 32 to 39 have pulse parameters not satisfying the preferred parameter conditions for the second method although the third pulse was used, and are evaluated as good (◯). In Table 4, numerical values below the upper limit or above the upper limit of the preferred parameter conditions for the second method are underlined. Further, amounts of spatters and fumes in Examples 32 to 29 are larger than Examples 24 to 31, but an amount of generated spatters is less than 4.0 [g/min] and an amount of generated fumes does not exceed 400 [mg/min].

The reason the amounts of spatters and fumes of Examples 32 to 39 in Table 4 are evaluated as good (◯) is as follows.

Example 32

Since Ip3 is equal to or lower than a lower limit of the preferred parameter condition for the second method (hereinafter simply referred to as "lower limit"), it is difficult to push up a droplet again and to restore the regularity that one droplet is supplied at each period, leading to an increase in spatter and fume amounts.

Example 33

Since Ip3 is equal to or higher than an upper limit of the preferred parameter condition for the second method (hereinafter simply referred to as "upper limit"), the wire is overmolten and in addition, an arc force tends to increase and a droplet is easily turned into spatters. Further, an amount of fumes increases due to overheating of a droplet.

Example 34

Since Tp3 is equal to or lower than the lower limit, it is difficult to push up a droplet again and to restore the regularity that one droplet is supplied at each period, leading to an increase in spatter and fume amounts.

Example 35

Since Tp3 is equal to or higher than the upper limit, the wire is overmolten and in addition, an arc force tends to increase and a droplet is easily turned into spatters in the peak period.

Further, an amount of fumes increases due to overheating of a droplet.

Example 36

Since Ib3 is equal to or lower than the lower limit, interruption and short-circuit of the arc often occur and amounts of spatters and fumes increase.

Example 37

Since Ib3 is equal to or higher than the upper limit, at the instance when the arc is moved from the droplet to the wire, melt residual in the wire tends to be blown away, and amounts of small spatters and fumes increase.

Example 38

Since Tb3 is equal to or lower than the lower limit, interruption and short-circuit of the arc often occur and amounts of spatters and fumes increase.

Example 39

Since Tb3 is equal to or higher than the upper limit, at the instance when the arc is moved from the droplet to the wire, melt residual in the wire tends to be blown away, and amounts of small spatters and fumes increase.

What is claimed is:

1. A welding control apparatus used for arc welding with a single carbon dioxide gas or a mixed gas mainly containing the carbon dioxide gas being used as a shielding gas, comprising:
a droplet separation detecting unit that detects separation of a droplet from a tip end of welding wire; and
a waveform generator that alternately generates a first pulse for separating the droplet and a second pulse for shaping the droplet and outputs the generated pulse to a welding power source, and if separation of the droplet is detected, immediately switches a current value of the first pulse to a predetermined value lower than a value measured upon the detection of separation,
the waveform generator generating a third pulse having a pulse shape different in at least one of a pulse peak current and a pulse width from the second pulse to output the generated third pulse to the welding power source after a base time of the first pulse if separation of the droplet is not detected within a peak period, a falling slope period, or a base period of the first pulse, and if separation of the droplet is detected after generation of the third pulse, switches a current value of the third pulse to a predetermined value lower than a value measured upon the detection of separation.

2. The welding control apparatus according to claim 1, wherein if separation of the droplet is detected within a peak period or a falling slope period of the third pulse, the waveform generator immediately switches a current value of the third pulse to a predetermined value lower than a value measured upon the detection of separation and then generates the second pulse and outputs the generated second pulse to the welding power source after a preset period for the predetermined value of the current.

3. The welding control apparatus according to claim 2, wherein if separation of the droplet is not detected within a peak period or a falling slope period of the third pulse, the waveform generator repeatedly and continuously generates the third pulse a preset number of times or less to output the generated third pulse to the welding power source.

4. The welding control apparatus according to claim 2, wherein the apparatus satisfy such conditions that the first pulse has a peak current $Ip1$ of 300 to 700 A, the first pulse has a peak period $Tp1$ of 0.3 to 5.0 ms, the first pulse has a base current $Ib1$ of 30 to 200 A, the first pulse has a base period $Tb1$ of 0.3 to 10 ms, the second pulse has a peak current $Ip2$ that satisfies a condition of $Ip2<Ip1$ and ranges from 200 to 600 A, the second pulse has a peak period $Tp2$ of 1.0 to 15 ms, the second pulse has a base current $Ib2$ of 30 to 200 A, and the second pulse has a base period $Tb2$ of 3.0 to 20 ms, the predetermined value for the third pulse corresponds to a base current that is a current value in a base period of the third pulse, the preset period is the base period of the third pulse, the third pulse has a peak current $Ip3$ of 300 to 700 A, the third pulse has a rising slope period $Tu3$ of 5.0 ms or less, the third pulse has a peak period $Tp3$ of 0.3 to 5.0 ms, the third pulse has a falling slope period $Td3$ of 10.0 ms or less, the third pulse has a base current $Ib3$ of 30 to 200 A, and the third pulse has a base period $Tb3$ of 0.3 to 10 ms.

5. The welding control apparatus according to claim 1, wherein if separation of the droplet is not detected in a peak period, a falling slope period, or a base period of the third pulse, the waveform generator generates the first pulse and outputs the generated first pulse to the welding power source after the base period of the third pulse.

6. The welding control apparatus according to claim 5, wherein the apparatus satisfies such conditions that the first pulse has a peak current $Ip1$ of 300 to 700 A, the first pulse has a peak period $Tp1$ of 0.3 to 5.0 ms, the first pulse has a base current $Ib1$ of 30 to 200 A, the first pulse base period $Tb1$ of 0.3 to 10 ms, the second pulse has a peak current $Ip2$ that satisfies a condition of $Ip2<Ip1$ and ranges from 200 to 600 A, the second pulse has a peak period $Tp2$ of 1.0 to 15 ms, the second pulse has a base current $Ib2$ of 30 to 200 A, the second pulse has a base period $Tb2$ of 3.0 to 20 ms, the third pulse has a peak current $Ip3$ of 100 to 400 A, the third pulse has a peak period $Tp3$ of 0.3 to 10.0 ms, the third pulse has a base current $Ib3$ of 30 to 200 A, and the third pulse has a base period $Tb3$ of 0.3 to 15 ms.

7. A welding control method for a welding control apparatus used for arc welding with a single carbon dioxide gas or a mixed gas mainly containing the carbon dioxide gas being used as a shielding gas, the welding control apparatus including a droplet separation detecting unit and a waveform generator the method comprising the steps of:
generating a first pulse for separating the droplet and a second pulse for shaping the droplet, using the waveform generator;
detecting separation of a droplet from a tip end of a welding wire, using the droplet separation detecting unit;
if separation of the droplet is detected, causing the waveform generator to immediately switch a current value of the first pulse to a predetermined value lower than a value measured upon the detection of separation and thereafter generate the second pulse;
if separation of the droplet is not detected within a peak period, a falling slope period, or a base period of the first pulse by the droplet separation detecting unit, generating a third pulse having a pulse shape different in at least one of a pulse peak current and a pulse width from the second pulse to output the generated third pulse to a welding power source after a base time of the first pulse; and if separation of the droplet is detected after generation of the third pulse, switching a current value of the third pulse to a predetermined value lower than a value measured upon the detection of separation, to thereby restore a droplet supply regularity by use of the waveform generator.

* * * * *